United States Patent

Isokawa et al.

[11] Patent Number: 6,163,425
[45] Date of Patent: Dec. 19, 2000

[54] MAGNETIC REPRODUCTION APPARATUS HAVING MR HEAD IN WHICH ELECTROMIGRATION OCCURRING IN MR HEAD IS SUPPRESSED

[75] Inventors: Hiroshi Isokawa; Yukio Abe, both of Kawasaki, Japan

[73] Assignee: Fujitsu Limited, Kawasaki, Japan

[21] Appl. No.: 09/000,509

[22] Filed: Dec. 30, 1997

[30] Foreign Application Priority Data

Mar. 19, 1997 [JP] Japan .................................. 9-066434

[51] Int. Cl.⁷ .............................. G11B 5/03; G11B 5/596
[52] U.S. Cl. .......................................... 360/66; 360/77.02
[58] Field of Search .................................. 360/66, 46, 61, 360/77.02

[56] References Cited

U.S. PATENT DOCUMENTS

| | | | |
|---|---|---|---|
| 5,323,278 | 6/1994 | Contreras et al. | 360/67 |
| 5,343,337 | 8/1994 | Jurneke | 360/63 |
| 5,572,379 | 11/1996 | Aoi et al. | 360/66 |
| 5,606,470 | 2/1997 | Shioya et al. | 360/78.04 |

FOREIGN PATENT DOCUMENTS

| | | |
|---|---|---|
| 63201963 | 8/1988 | Japan . |
| 4271001 | 9/1992 | Japan . |
| 5225531 | 9/1993 | Japan . |
| 6267001 | 9/1994 | Japan . |
| 7057203 | 3/1995 | Japan . |
| 785403 | 3/1995 | Japan . |
| 7262539 | 10/1995 | Japan . |
| 8190703 | 7/1996 | Japan . |

Primary Examiner—W. Chris Kim
Attorney, Agent, or Firm—Greer, Burns & Crain, Ltd.

[57] ABSTRACT

In a magnetic reproduction apparatus having an MR head, electromigration occurs when a sense current is supplied to the MR head is suppressed, and the service life and reliability of the magnetic reproduction apparatus are improved. Information magnetically recorded on at least one recording medium is read by supplying a sense current to the MR head opposed to the record surface of the recording medium using a current supply circuit, and then decoded by a signal decoder. In the magnetic reproduction apparatus, an MR head information judgment circuit judges whether or not information to be read out from the recording medium by the MR head is needed. Only when the information to be read out by the MR head is needed, does a current supply control circuit allow the current supply circuit to supply the sense current to the MR head. The sense current can be controlled by turning on or off an on-off operation circuit. Owing to this configuration, electromigration can be suppressed and the service life and reliability of the apparatus can be improved.

19 Claims, 21 Drawing Sheets

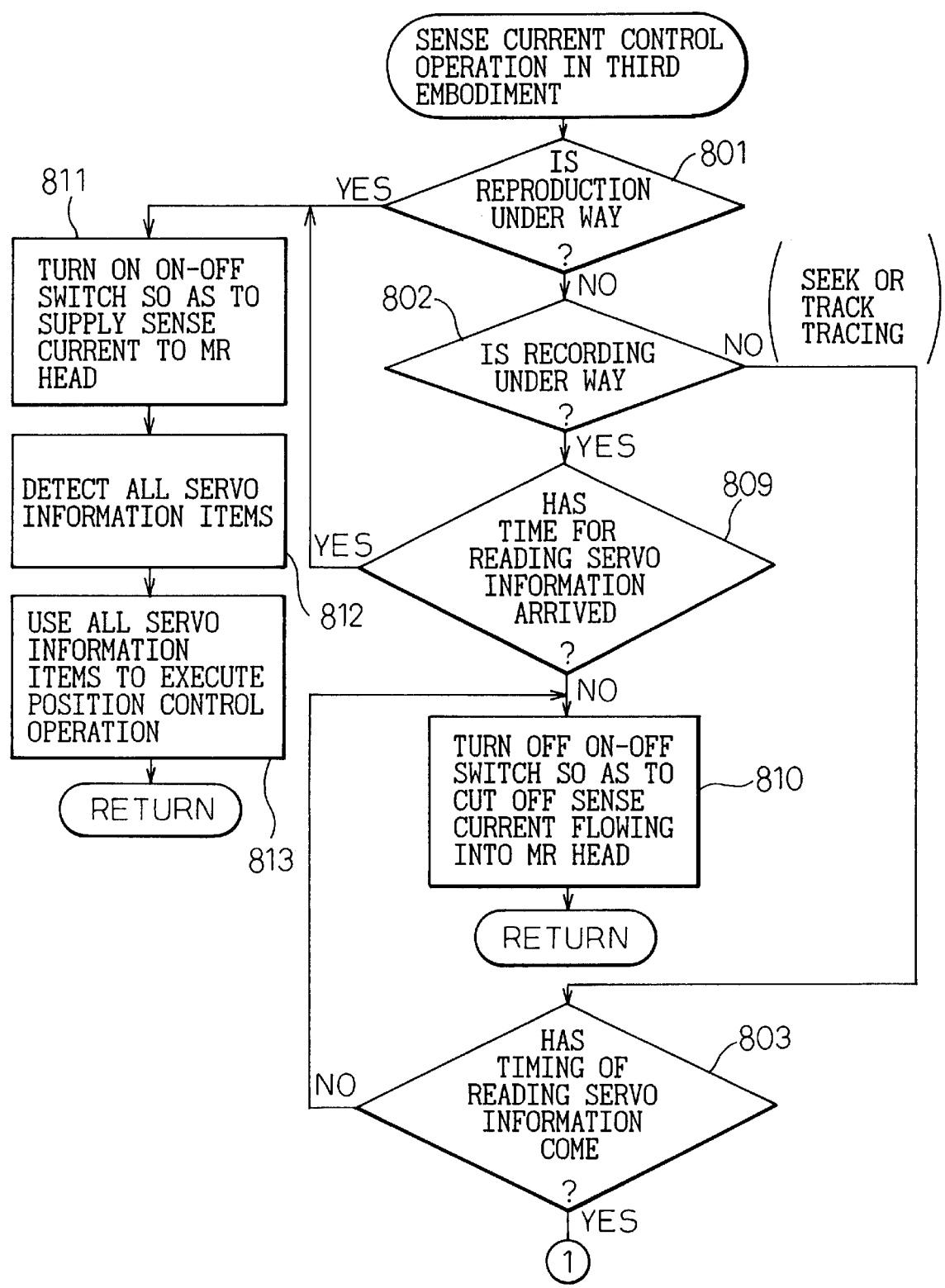

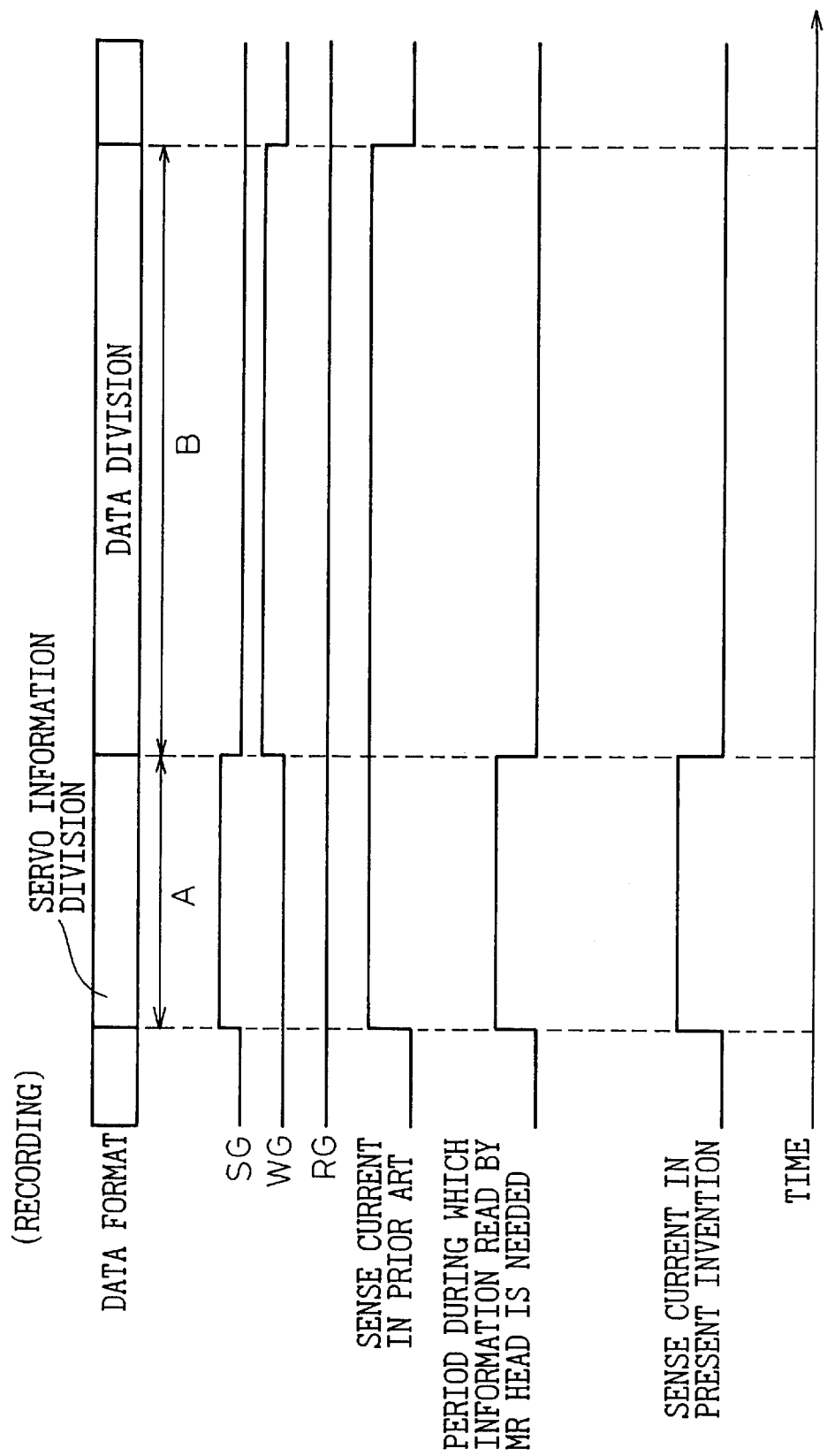

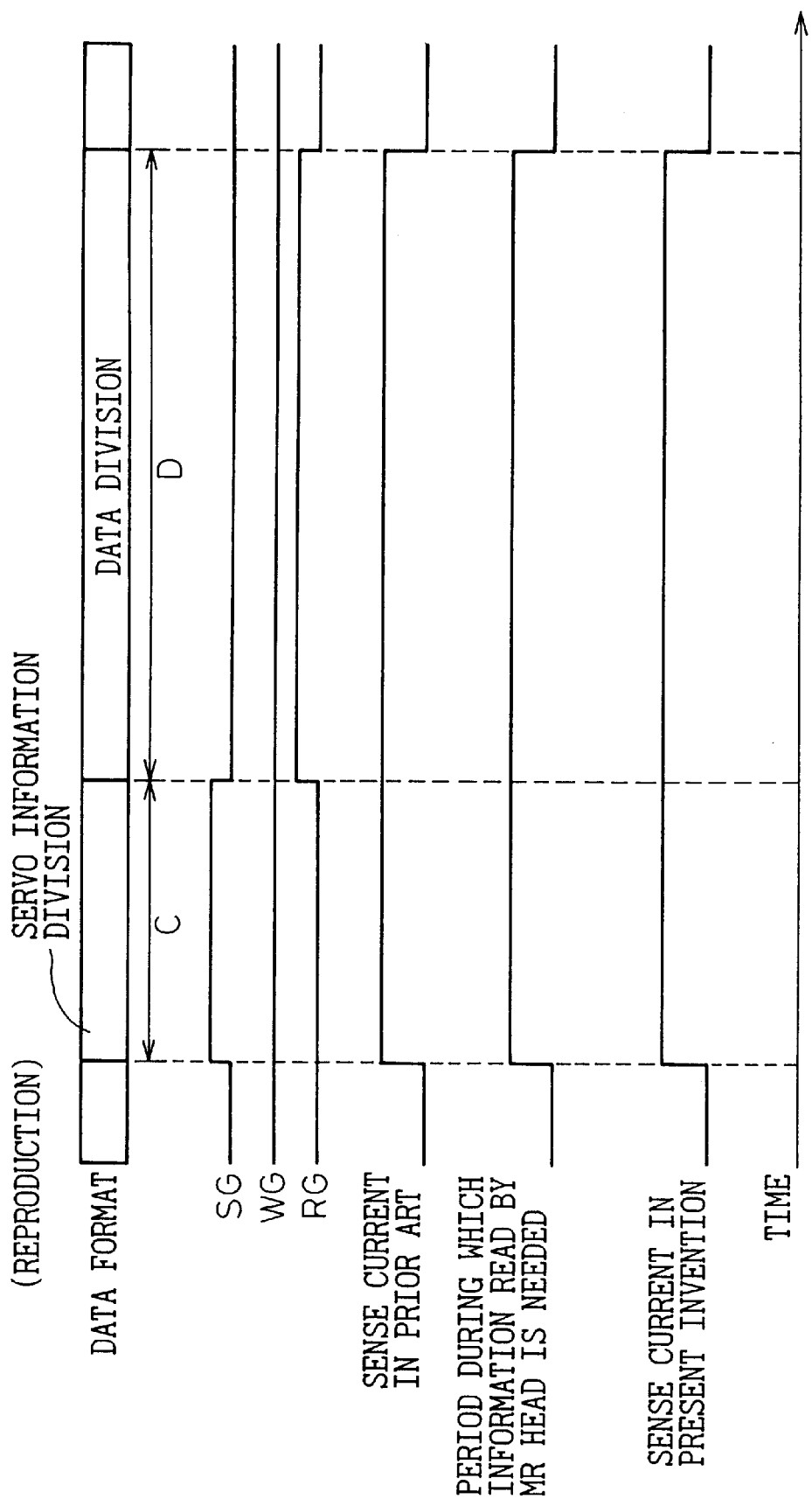

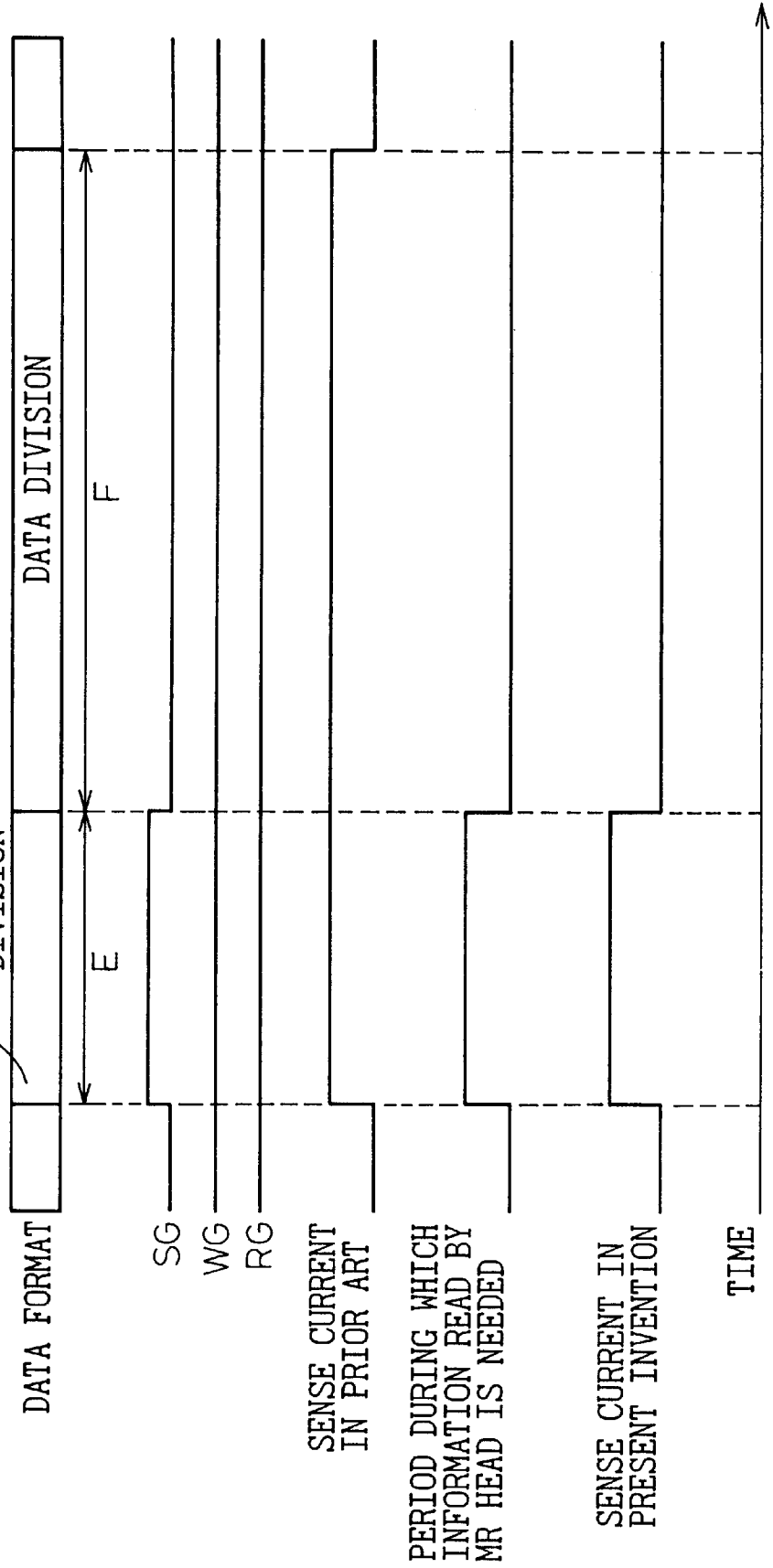

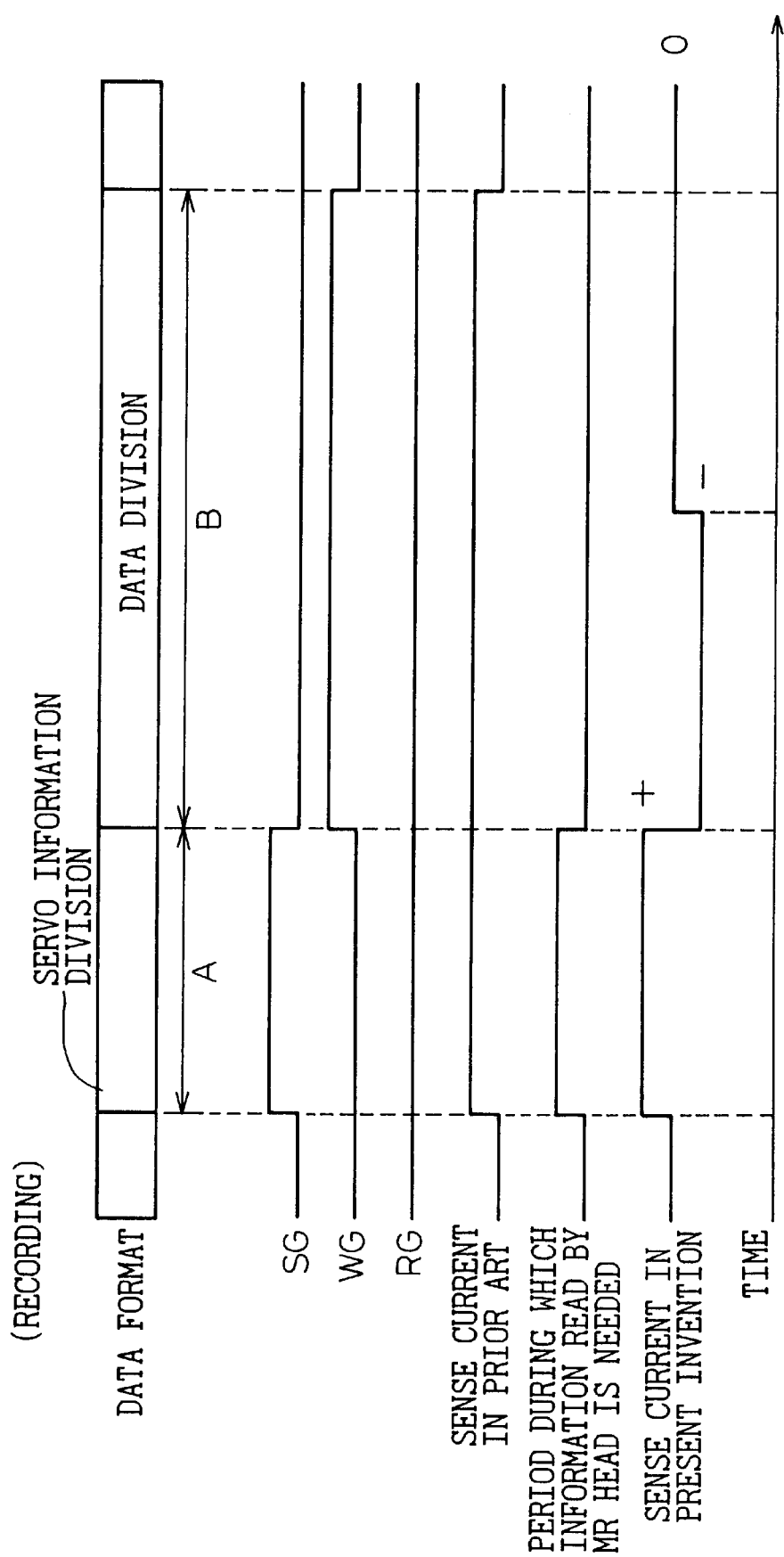

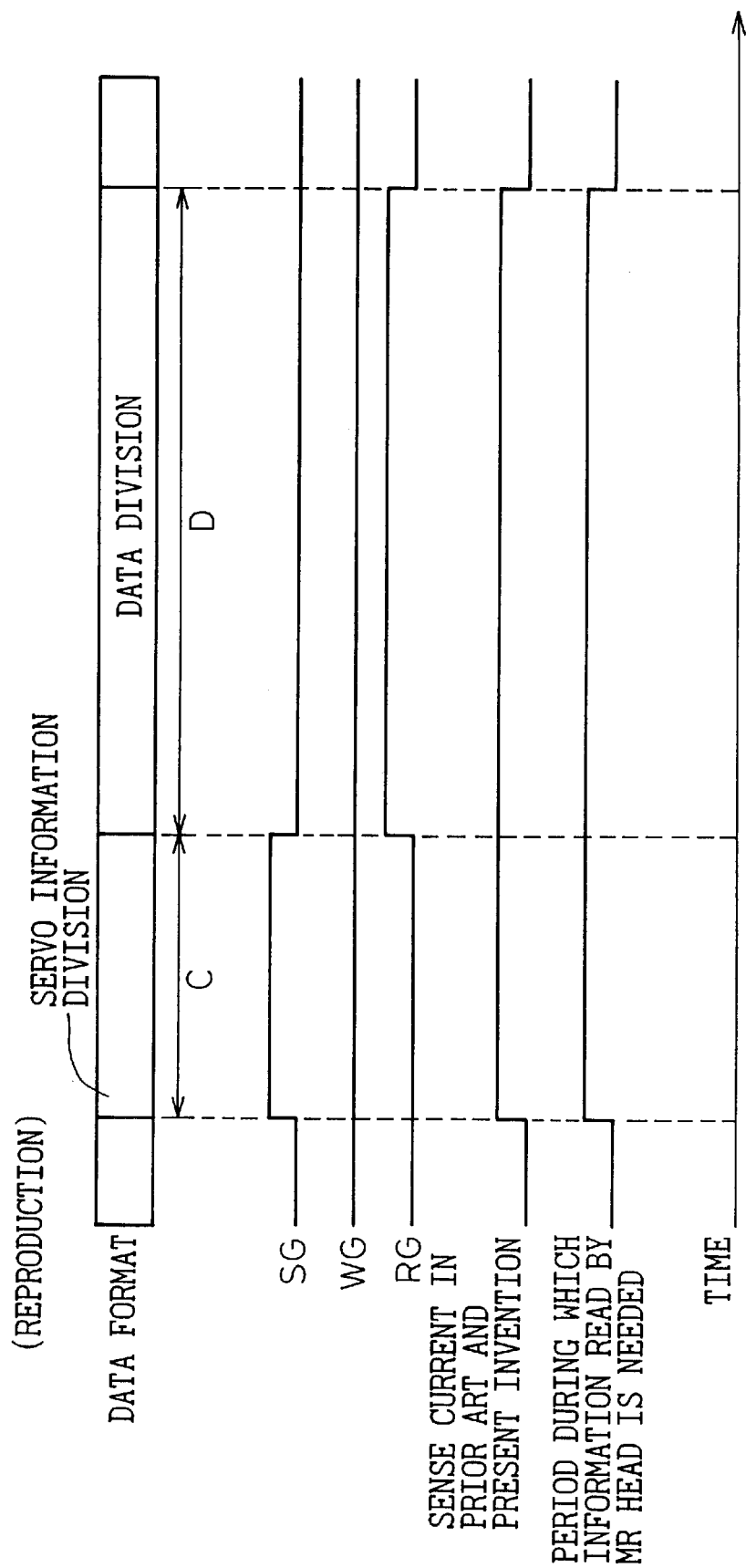

MAGNETIC REPRODUCTION APPARATUS HAVING MR HEAD IN WHICH ELECTROMIGRATION OCCURRING IN MR HEAD IS SUPPRESSED

BACKGROUND OF THE INVENTION

1. Field of the Invention

The present invention relates to a magnetic reproduction apparatus having a magnetoresistance effect head (MR head). More particularly, this invention is concerned with a magnetic reproduction apparatus in which electromigration occurring in an MR head for reproducing information recorded on a magnetic recording medium is suppressed.

2. Description of the Related Art

In magnetic recording/reproducing apparatuses for recording or reproducing information on or from a magnetic recording medium, such as a magnetic disk unit or magnetic tape unit, a magnetic recording/reproducing apparatus having a composite head composed of a winding-type thin film magnetic head (inductive head) used for recording on a recording medium and an MR head used for reproduction has been put to practical use.

An MR head included in such a composite head detects a leakage magnetic field induced by a reversal of magnetization in a recording medium on the basis of the fact that the resistance of an element varies depending on an external magnetic field. A current termed a sense current is fed to the element when it is used. A reproduced output of the MR head is, unlike that of an inductive head, independent of the speed of the head in relation to a recording medium, is acquired as a relatively large value proportional to a magnetic flux density, and is therefore very useful in reproducing data from a high-density recording track. When the sense current flowing into the element in the MR head is increased, a large reproduced signal can be acquired irrespective of the relative speed of the head in relation to a disk. For this reason, the MR head is favorably adopted for a high-density magnetic disk unit. Due to an increasing demand for a larger-capacity magnetic disk units to be used as external storage units for computers, the MR head has been widely adopted in recent years.

However, as far as a magnetic reproduction apparatus using the MR head is concerned, when the current density of the sense current is raised, a phenomenon of electromigration resulting from the movement of metal atoms from a cathode to an anode due to collision of conduction electrons takes place. The electromigration may bring about an increase in direct current resistance or a disconnection. A countermeasure against this electromigration is requested.

The service life of an MR head is inversely proportional to the value of a sense current. When a certain sense current is supplied to the MR head, the service life of the MR head is inversely proportional to the time during which the MR head conducts the sense current.

In a magnetic reproduction apparatus using an MR head, therefore, a sense current flowing into the MR head is usually set to the range from $10^6$ to $10^7$ A/cm$^2$ in an effort to acquire a large reproduced output from the MR head. As a result, an element in the MR head is heated to a higher temperature than that in an inductive head. Moreover, when the current density of the sense current is high, the electromigration phenomenon takes place. This brings about the fear of deterioration of the magnetic properties of a magnetic film in a head or the fear of a disconnection.

It is effective to suppress electromigration by shortening the time during which a sense current flows unidirectionally in an element in an MR head. A countermeasure against electromigration implemented in a known magnetic disk unit is, for example, as disclosed in Japanese Unexamined Patent Publication No. 5-225531, to reverse the sense current.

However, when the sense current is reversed according to the method disclosed in the Japanese Unexamined Patent Publication No. 5-225531, the direction of the sense current is changed during reproduction of a normal record signal. It is hard to stabilize the reproduction ability of an MR head despite a change in direction of the sense current. This poses a problem that a variation in characteristic of a reproduced signal must be corrected at every reversal of the direction of the sense current.

SUMMARY OF THE INVENTION

The first object of the present invention is to solve the problems lying in the prior art and to provide a magnetic reproduction apparatus having a highly durable and reliable MR head in which an adverse effect of electromigration on the MR head is prevented by including a control means for giving control so that a sense current will not flow into the MR head during a period during which it is unnecessary to supply the sense current to the MR head.

The second object of the present invention is to provide a magnetic disk unit having a highly reliable and durable MR head in which the direction of a sense current is reversed only during a period during which it is unnecessary to supply the sense current to the MR head.

The third object of the present invention is to improve the reliability and durability of a sector-servo type magnetic disk unit having a plurality of MR heads by adopting an MR head, which has the smallest total flowing time of a sense current, for a seeking operation or track tracing operation and by thus making the service lives of the MR heads uniform.

For accomplishing the first object of the present invention, in a magnetic reproduction apparatus having an MR head, information magnetically recorded on at least one recording medium is read by supplying a sense current to an MR head opposed to a record surface of the recording medium using a current supply means, and then decoded by a signal decoding means. The magnetic reproduction apparatus comprises an MR head information judgment means for judging whether or not information to be read from the recording medium by the MR head is needed, and a current supply control means that when information to be read out by the MR head is needed, allows the current supply means to supply the sense current to the MR head.

When an on-off operation means is placed on a power supply path from the current supply means to the MR head, if the current supply control means judges that information to be read out by the MR head is not needed, the current supply control means turns off the on-off operation means.

In this case, only when it is necessary to read information from the recording medium by the MR head, does the sense current flow into the MR head. The time during which the MR head conducts the sense current can be shortened. This leads to suppression of electromigration. Eventually, the durability and reliability of the magnetic reproduction apparatus is improved.

Moreover, when the on-off operation means is placed on a path linking the current supply means and a power supply, if the current supply control means judges that information to be read out by the MR head is not needed, the current supply control means turns off the on-off operation means.

In this case, only when it is necessary to supply the sense current to the MR head, the sense current supply means operate. This leads to suppression of electromigration. Eventually, the durability and reliability of the magnetic reproduction apparatus is improved and the power consumption thereof diminishes.

In the aforesaid configuration, when servo information must be read from the recording medium, the current supply control means judges that information to be read out by the MR head is needed.

In this case, the recording medium is a magnetic disk. A servo information thinning and sampling means for sampling and reading every M-th servo information item by thinning N servo information items residing along one circumference of the disk, a servo information predicting means for predicting current servo information as a substitute for thinned-out servo information on the basis of such information as a previous rotating speed of the disk, the position of the MR head, an output current, and a bias current, and a position control means for controlling the position of the MR head on the basis of the predicted servo information may be included.

In this case, a control parameter storage means for storing parameters for position control specified for thinning and sampling, which are different from parameters for position control specified for normal position control, may be substituted for the servo information prediction means. For thinning and sampling of servo information, the position control means may use the different position control parameters to control the position of the MR head.

Under the above control, the sense current flowing into an MR head during seeking or track tracing is limited. The ratio of the time for seeking and track tracing to a total operation time of the magnetic reproduction apparatus is the largest. Electromigration can therefore be suppressed effectively, and the durability and reliability of the magnetic reproduction apparatus is improved.

For accomplishing the second object of the present invention, the magnetic reproduction apparatus having an MR head further comprises a reproduction detection means for detecting that the magnetic reproduction apparatus is engaged in reproduction, and a polarity reversal means for supplying the sense current to the MR head while reversing the polarity of the sense current according to a predetermined timing when the magnetic reproduction apparatus is not engaged in reproduction.

When it is unnecessary to read information from the recording medium by the MR head, the polarity reversal means reverses the direction of the sense current flowing into the MR head. This makes it unnecessary to take care of a variation in reproduction ability of the MR head derived from a variation in polarity of the sense current, that is, the positive or negative polarity thereof. Moreover, since an integrated value of the sense current calculated by taking account of the signs of the levels is stored all the time, the direction of the sense current can be reversed according to the timing of making the integrated value null. As a result, electromigration is suppressed. Thus, a highly durable and reliable magnetic reproduction apparatus is provided.

The predetermined timing is found within a period during which information to be read from the recording medium by the MR head is judged not to be needed by the MR head information judging means.

Furthermore, when a plurality of MR heads are included, an integration means for calculating the time during which each MR head conducts a sense current, a shortest operation MR head identification means for identifying an MR head that has conducted the sense current for the shortest time or the sense current of the smallest integrated value, and a servo current selection and supply means that when servo information is to be read out by an MR head, reads out servo information by supplying the sense current to an MR head having conducted the sense current for the shortest time or the sense current of the smallest integrated value are included.

For reading servo information using the MR heads, the servo current selection and supply means may supply the sense current successively to the MR heads over the same time per head.

The MR head information judgment means may judge whether or not information to be read out by an MR head is needed by recognizing which of a Read gate signal or Servo gate signal is produced by the current supply control means.

Thus, an MR head to which a sense current is supplied is switched to another at certain intervals so that the total time during which the sense current is supplied will be equal among the heads. Consequently, it will not take place that electromigration occurring in a certain head progresses. Eventually, the durability and reliability of the magnetic reproduction apparatus improve.

BRIEF DESCRIPTION OF THE DRAWINGS

The present invention will be more clearly understood from the description as set forth below with reference to the accompanying drawings, wherein:

FIGS. 8A and 8B are flowcharts describing a control flow for a sense current control operation in accordance with the third embodiment of the present invention;

FIG. 11 is a timing chart showing the relationship between a gate signal to be applied for recording and a sense current controlled according to the control flow of the first embodiment of the present invention with respect to a data format for a sector-servo type magnetic disk apparatus;

FIG. 12 is a timing chart showing the relationship between a gate signal to be applied for reproduction and a sense current controlled according to the control flow of the first embodiment of the present invention with respect to the data format for the sector-servo type magnetic disk unit;

FIG. 13 is a timing chart showing the relationship between a gate signal to be applied for seeking or track tracing and a sense current controlled according to the control flow of the first embodiment of the present invention with respect to the data format for the sector-servo type magnetic disk unit;

FIG. 14 is a timing chart showing the relationship between a gate signal to be applied for recording and a sense current controlled according to the control flow of the second embodiment of the present invention with respect to a data format for a sector-servo type magnetic disk apparatus;

FIG. 15 is a timing chart showing the relationship between a gate signal to be applied for reproduction and a sense current controlled according to the control flow of the second embodiment of the present invention with respect to the data format for the sector-servo type magnetic disk unit;

DESCRIPTION OF THE PREFERRED EMBODIMENTS

Exemplary embodiments of the present invention will be described in conjunction with the appended drawings below.

Figure 1A:
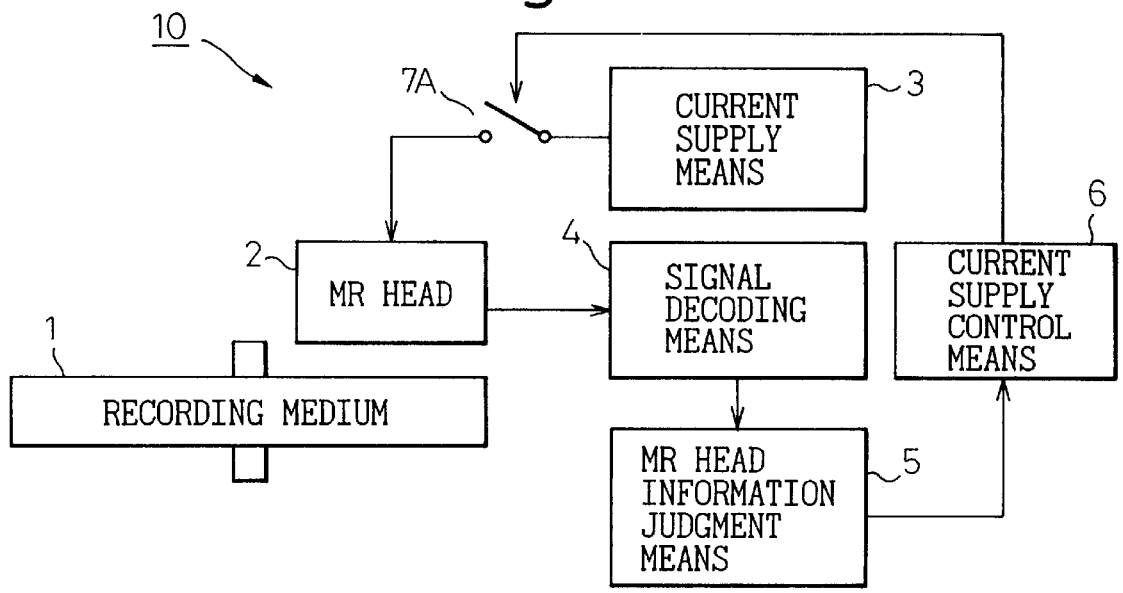
FIGS. 1A and 1B are diagrams showing the configuration of a magnetic reproduction apparatus having an MR head in accordance with the present invention on the basis of the principles of the present invention.
Figure 1B:
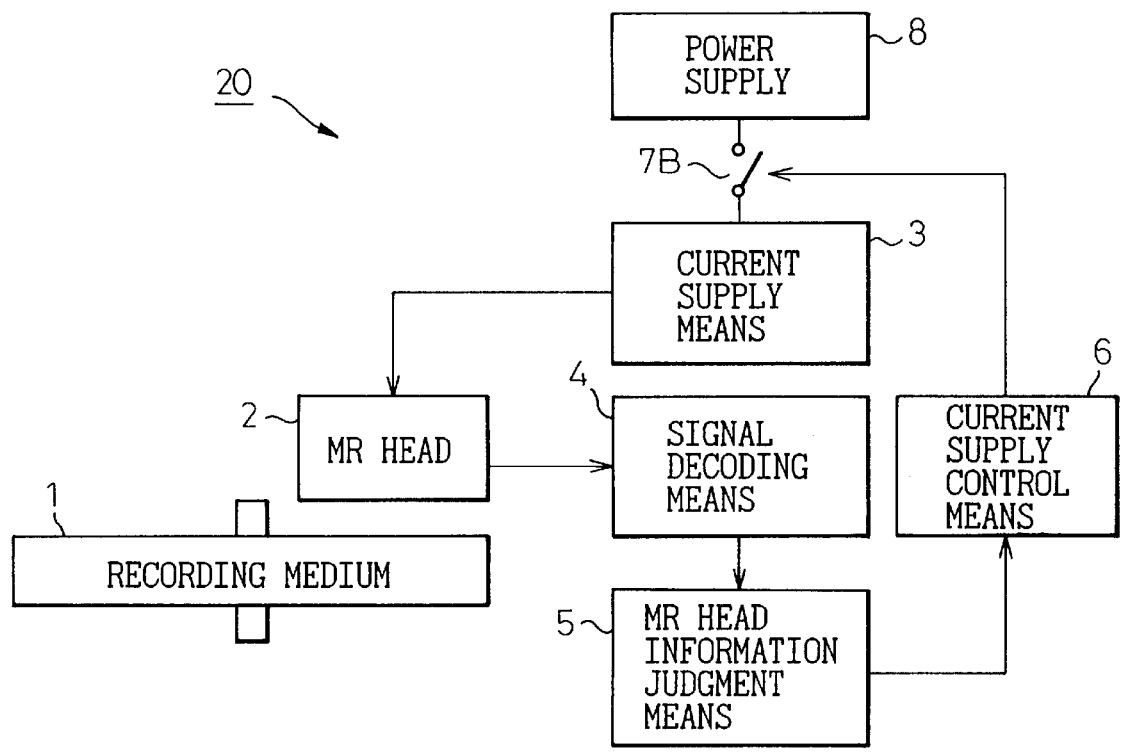
Figure 1C:
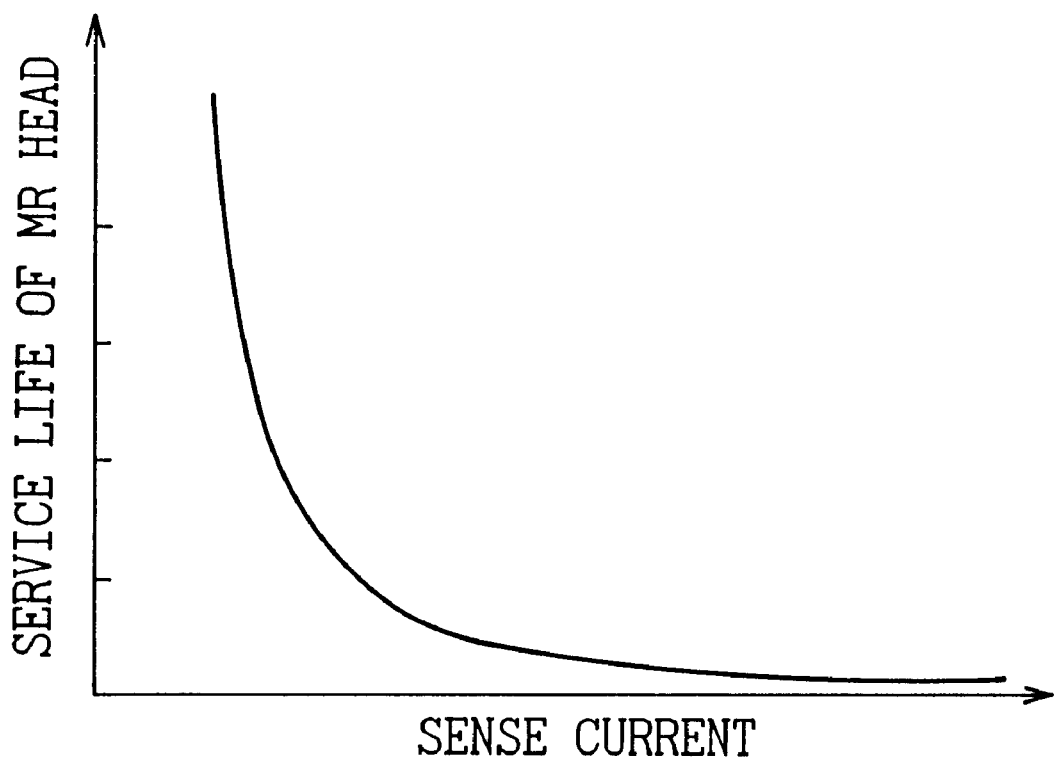
FIG. 1C is a graph showing a characteristic curve indicating the relationship between the magnitude of a sense current to be supplied to an MR head and the service life of the MR head.

FIG. 1C is a graph showing the relationship between the magnitude of a sense current to be supplied to an MR head and the service life of the MR head. As seen from FIG. 1C, the service life of an MR head is inversely proportional to the level of the sense current. When a certain sense current is supplied to an MR head, the service life of the MR head is inversely proportional to the time during which the MR head conducts the sense current.

In a magnetic reproduction apparatus using an MR head, if a sense current to be supplied to an MR head is increased in order to obtain a large reproduced output from the MR head, the service life of the MR head is shortened. Specifically, when the sense current to be supplied to the MR head is increased, a magnetoresistor is heated to a high temperature. Moreover, when the current density of the sense current is high, an electromigration phenomenon takes place. This brings about deterioration in magnetic property of a magnetic film of the head or disconnection. Consequently, the service life of the MR head is shortened. The present invention attempts to extend the service life of an MR head while suppressing electromigration.

FIG. 1A shows the configuration of a magnetic reproduction apparatus 10 having an MR head in accordance with the first embodiment which is based on the principle of the present invention and intended to accomplish the first object of the present invention. The magnetic reproduction apparatus 10 has an on-off operation means 7A interposed between an MR head 2 and current supply means 3. When the on-off operation means 7A is on, a sense current is supplied from the current supply means 3 to the MR head 2 opposed to a record surface of at least one recording medium 1. At this time, information magnetically recorded on the recording medium 1 is read by the MR head 2. Information read by the MR head 2 is then decoded by a signal decoding means 4. Whether or not the decoded information is needed is judged by an MR head information judgment means 5. If information read by the MR head 2 is needed, a current supply control means 6 allows the current supply means 3 to supply a sense current to the MR head 2.

When the current supply control means 6 judges that information to be read out by the MR head 2 is not needed, the on-off operation means 7A is turned off.

FIG. 1B shows the configuration of a magnetic reproduction apparatus 20 having an MR head in accordance with the second embodiment which is based on the principle of the present invention and intended to accomplish the first object of the present invention. The magnetic reproduction apparatus 20 has an on-off operation means 7B interposed between a current supply means 3 and power supply 8. When the on-off operation means 7B is on, a sense current is supplied from a current supply means 3 to an MR head 2 opposed to a record surface of at least one recording medium 1. At this time, information magnetically recorded on the recording medium 1 is read by the MR head 2. The information read by the MR head 2 is decoded by a signal decoding means 4. Whether or not the decoded information is needed is judged by an MR head information judgment means 5. If information read by the MR head 2 is needed, a current supply control means 6 allows the current supply means 3 to supply a sense current to the MR head 2.

When the current supply control means 6 judges that information to be read out by the MR head 2 is not needed, the on-off operation means 7B is turned off.

According to the magnetic reproduction apparatuses 10 and 20, only when it is necessary to read out information from the recording medium 1 using the MR head 2, is a sense current supplied to the MR head 2. The time during which the MR head 2 conducts the sense current can be shortened. This leads to suppression of electromigration. Eventually, the durability and reliability of the magnetic reproduction apparatuses 10 and 20 improve.

Moreover, only when it is necessary to supply a sense current to the MR head 2, is the current supply means 6 operated. Not only the durability and reliability of the magnetic reproduction apparatus improve but also the power consumption thereof diminishes.

In the magnetic reproduction apparatuses 10 and 20 having the components shown in FIGS. 1A and 1B, when servo information must be read out from the recording medium 1, the current supply control means 6 judges that information to be read out by the MR head 2 is needed.

In this case, the recording medium 1 is a magnetic disk. Moreover, a servo information thinning and sampling means for sampling and reading every M-th servo information item by thinning N servo information items residing along one circumference of the disk, a servo information prediction means for predicting current servo information as a substitute for thinned-out servo information on the basis of such information as a previous rotating speed of the disk 1, the position of the MR head 2, an output current, a bias current, and a position control means for controlling the position of the MR head 2 on the basis of the predicted servo information are further included.

In this case, a control parameter storage means for storing parameters for position control specified for thinning and sampling, which are different from parameters for position control specified for normal position control, may be substituted for the servo information prediction means. When servo information is thinned and sampled, the position control means may control the position of the MR head 2 using the different position control parameters.

According to the fourth to sixth aspects of the present invention, during seeking or track tracing whose occupation ratio to the total operation time of the magnetic reproduction apparatus is large, the sense current to be supplied to the MR head is limited. Consequently, electromigration is suppressed effectively, and the durability and reliability of the magnetic reproduction apparatus improve.

According to a magnetic reproduction apparatus having an MR head which is intended to accomplish the second object of the present invention, the magnetic reproduction apparatus 10 or 20 shown in FIG. 1A or 1B further comprises a reproduction detection means for detecting whether or not the magnetic reproduction apparatus is engaged in reproduction, and a polarity reversal means for supplying a sense current to the MR head while reversing the polarity of the sense current according to given timing when the magnetic reproduction apparatus is not engaged in reproduction.

The predetermined timing is set within a period during which information to be read out from the recording medium 1 by the MR head 2 is judged not to be needed by the MR head information judgment means 5.

According to the foregoing configuration, when it is unnecessary to read out information from the recording medium 1 by the MR head 2, the direction of a sense current to be supplied to the MR head 2 is reversed. A variation in reproduction ability of the MR head 2 derived from a reversal in polarity of a sense current, that is, the positive or negative polarity thereof need not be considered, Moreover, since an integrated value of a sense current calculated by taking account of the signs of the levels of the sense current is stored all the time, the direction of the sense current can be reversed according to the timing of making the integrated value zero. As a result, electromigration is suppressed, and the durability and reliability of the magnetic reproduction apparatuses 10 and 20 improve.

According to a magnetic reproduction apparatus having an MR head which is intended to accomplish the third object of the present invention, the magnetic reproduction apparatus 10 or 20 shown in FIG. 1A or 1B includes a plurality of MR heads 2, and further comprises an integration means for calculating the time during which each MR head 2 conducts a sense current, a shortest operation MR head identification means for identifying an MR head 2 that has conducted the sense current for the shortest time, and a servo current selection and supply means that when servo information is to be read out by an MR head 2, reads servo information by supplying the sense current to the MR head whose total flowing time of the sense current for the shortest time is the smallest.

In the thus-configured magnetic reproduction apparatus having a plurality of MR heads, an MR head to which a sense current is supplied is switched to another at certain intervals so that the total time during which the sense current is supplied to a head will be equal among the MR heads. It will therefore not take place that electromigration occurring in a certain head progresses. This improves the durability and reliability of the magnetic reproduction apparatus.

When servo information is to be read out by an MR head, the servo current selection and supply means may read servo information by supplying a sense current successively to the MR heads over the same time per head.

The MR head information judgment means may judge whether or not information to be read out by an MR head is needed by recognizing which of a Read gate signal or Servo gate signal is produced by the current supply control means.

Exemplary embodiments corresponding to the configurations shown in FIGS. 1A and 1B based on the principles of the present invention will be described below.

Figure 2:
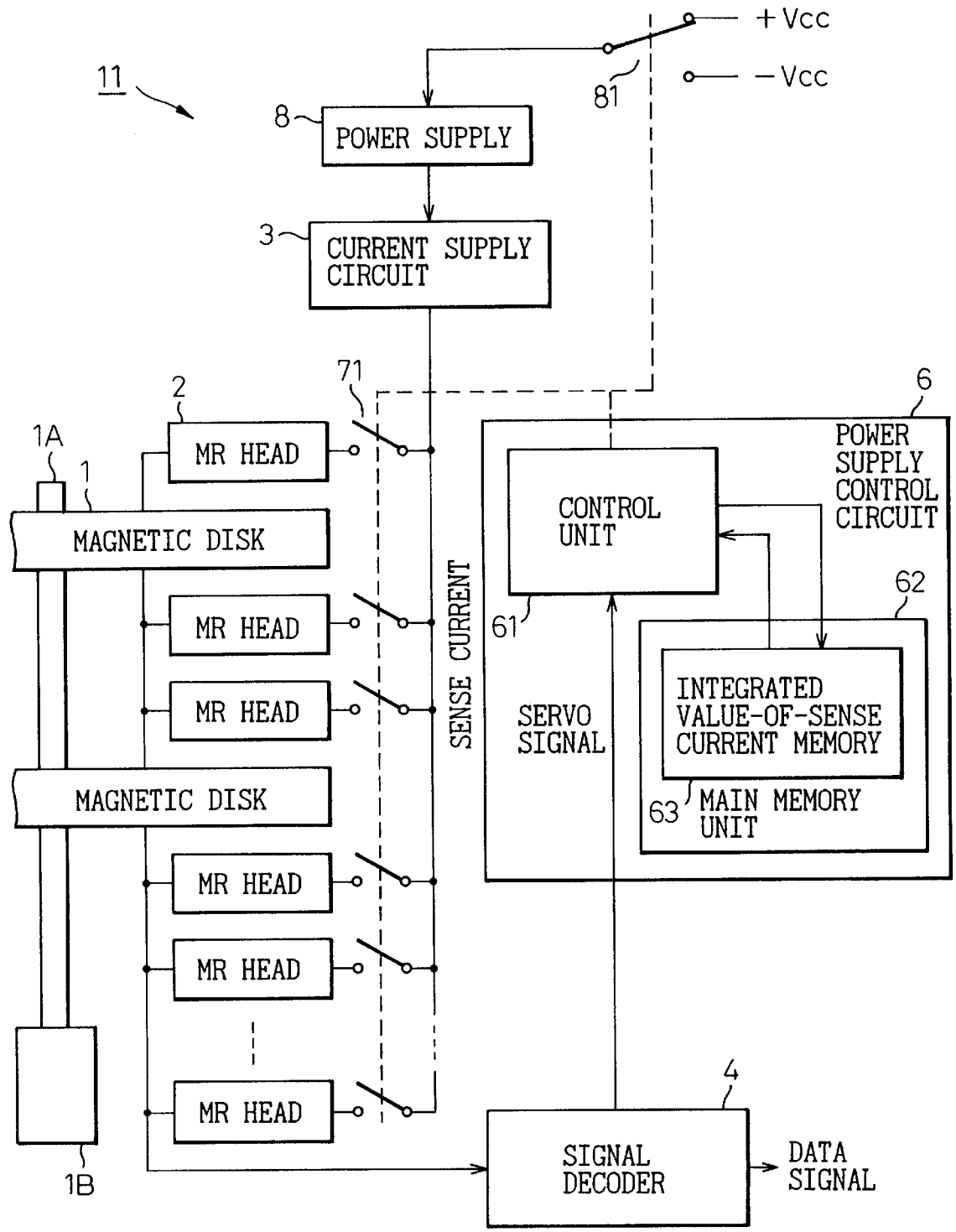
FIG. 2 is a block circuit diagram showing the configuration of a magnetic reproduction apparatus having an MR head in accordance with the first embodiment of the present invention.

FIG. 2 shows the configuration of a magnetic reproduction apparatus 11 of the first embodiment of the present invention corresponding to the configuration shown in FIG. 1A based on the principle of the present invention. In the first embodiment, the magnetic reproduction apparatus 11 is a magnetic disk unit having MR heads 2.

In the magnetic disk unit 11 of this embodiment, magnetic disks 1 corresponding to at least one recording medium are attached to the same rotational shaft 1A of a spindle motor 1B. The rotational shaft 1A is driven to rotate by means of a spindle motor 1B. MR heads 2 for reading information magnetically recorded on the magnetic disks 1 are located at regions opposed to the record surfaces of the magnetic disks 1. A sense current is supplied from a current supply circuit 3 to the MR heads 2. Information read out from the magnetic disks 1 by the MR heads 2 is decoded by a signal decoder 4. The signal decoder 4 outputs a decoded data signal and servo signal. The data signal is input to a data processing circuit that is not shown, and the servo signal is input to a control unit 61 in a power supply control circuit 6.

The power supply control circuit 6 controls supply of a sense current from the current supply circuit 3 to the MR heads 2, and includes a main memory unit 63 having an integrated value-of-sense current memory 62 in addition to the control unit 61. On-off switches 71 are located on a path along which a sense current is supplied from the current supply circuit 3 to the MR heads 2, and connected in series with the respective MR heads. The control unit 61 in the power supply control circuit 6 turns on any of the on-off switches 71 so as to supply a sense current from the current supply circuit 3 to a desired MR head 2.

The current supply circuit 3 is connected to a power supply 8. The power supply 8 is connected to a positive voltage source +Vcc and negative voltage source −Vcc, which are mutually opposite in polarity, via a selection switch 81. The selection switch 81 is normally connected to the positive voltage source +Vcc. When an on-off switch 71 is turned on, a sense current of positive polarity is supplied to an associated MR head. When the selection switch 81 is connected to the negative voltage source −Vcc, a sense current of negative polarity is supplied from the power supply 8 through the current supply circuit 3 and on-off switch 71.

In the magnetic reproduction apparatus 11 of the first embodiment having the on-off switches 71 connected in series with the MR heads 2, a sense current supplied to an individual MR head 2 is controllable.

Figure 3:
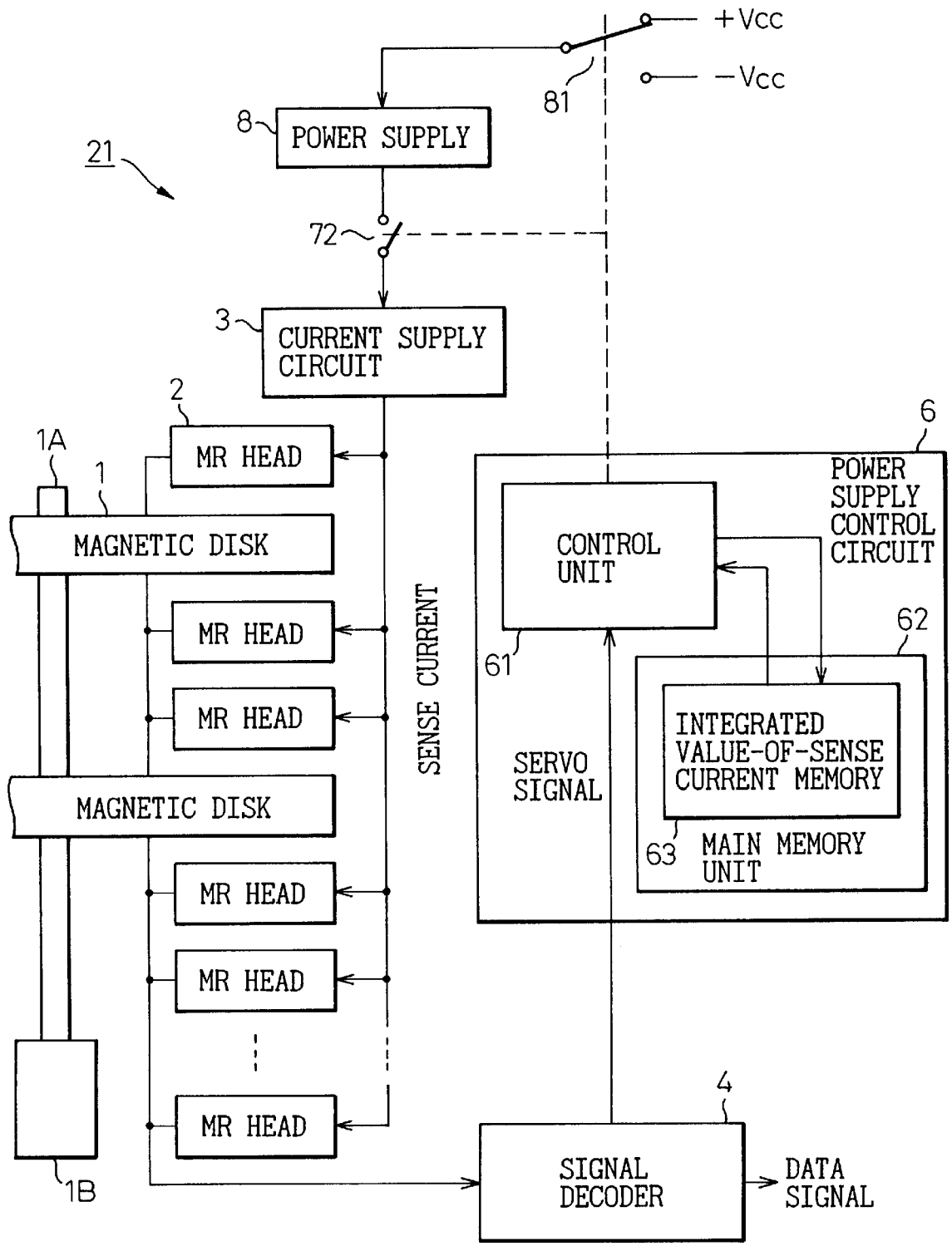
FIG. 3 is a block circuit diagram showing the configuration of a magnetic reproduction apparatus having an MR head in accordance with the second embodiment of the present invention.

FIG. 3 shows the configuration of a magnetic reproduction apparatus 21 in accordance with the second embodiment of the present invention which corresponds to the configuration shown in FIG. 1B which is based on the principle of the present invention. Even in the second embodiment, the magnetic reproduction apparatus 11 is a magnetic disk unit having MR heads 2.

The configuration of the magnetic reproduction apparatus 21 in accordance with the second embodiment is identical to that of the magnetic reproduction apparatus 11 in accordance with the first embodiment except a position at which an on-off switch 72 is installed. Specifically, the on-off switches 71 in the magnetic reproduction apparatus 11 of the first embodiment are connected in series with all the MR heads 2 and placed between the MR heads and the current supply circuit 3. The on-off switch 72 in the magnetic reproduction apparatus 21 of the second embodiment is interposed between the current supply circuit 3 and power supply 8. This is the only difference from the first embodiment.

The other components of the magnetic reproduction apparatus 21 of the second embodiment are identical to those of the magnetic reproduction apparatus 11 of the first embodiment. A description of the components will therefore be omitted.

In the magnetic reproduction apparatus 21 of the second embodiment having the on-off switch 72 interposed between the current supply circuit 3 and power supply 8, when a sense current is not supply to any MR head 2, power supply to the current supply circuit 3 is blocked. It will therefore not take place that an extra circuit is operated. This results in a reduced power consumption.

Figure 4:
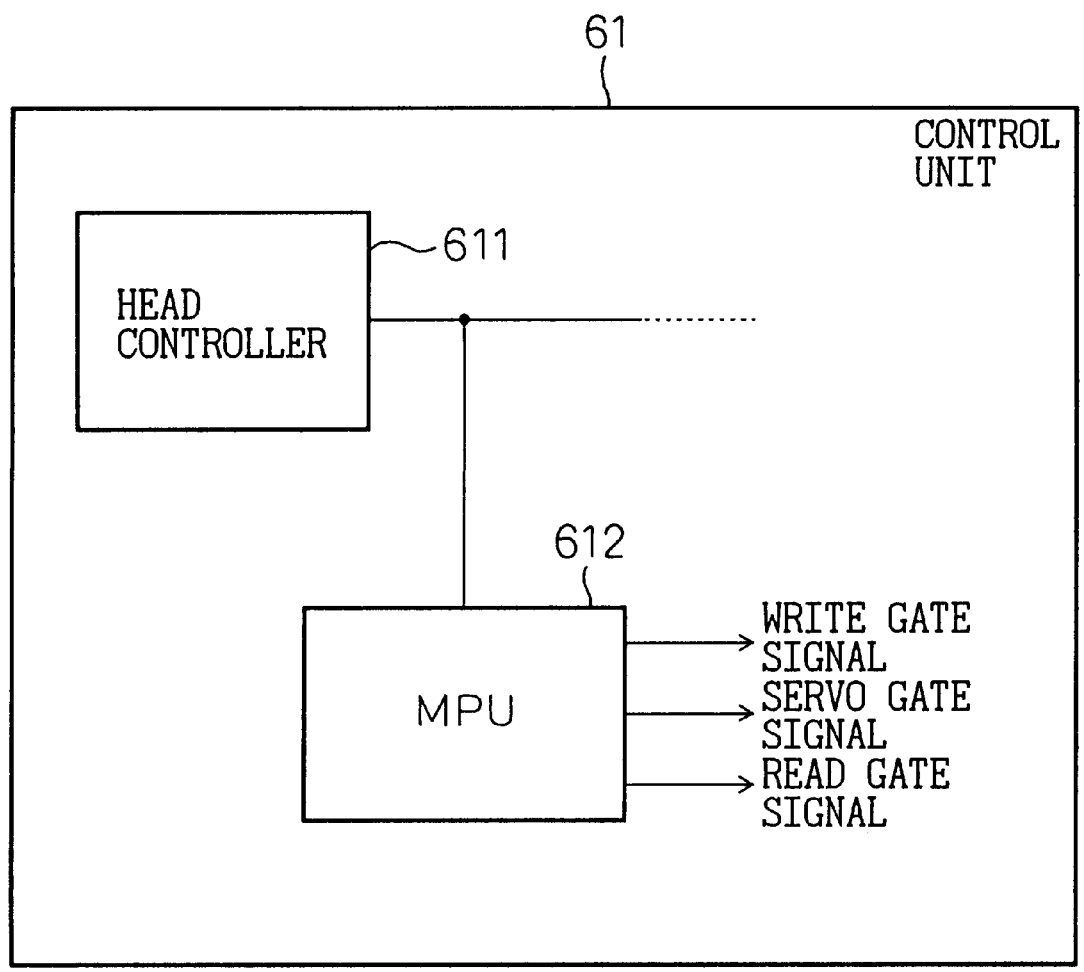
FIG. 4 is a block diagram showing the configuration of a control unit shown in FIG. 2.

The control unit 61 shown in FIGS. 2 and 3 includes, as shown in FIG. 4, an MPU 612 for outputting a Write gate signal, Servo gate signal, and Read gate signal which will be described later, and a head controller 611.

Figure 5:
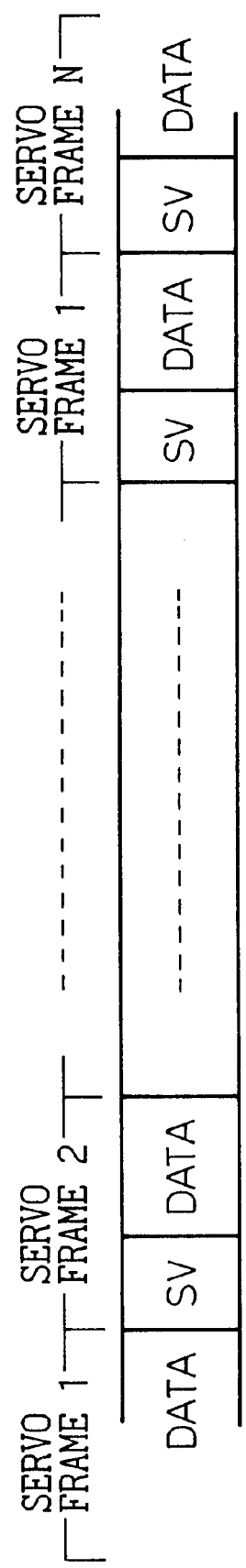
FIG. 5 is a diagram showing an example of the format of one track on a sector-servo type magnetic disk.

With an increase in track density, many magnetic disk units have come to adopt a sector servo system according to which servo information is recorded even on a data surface. FIG. 5 shows an example of a format for one track in a sector-servo type magnetic disk apparatus. N servo frames are defined along one circumference of each track on a magnetic disk. Each frame shall have a servo information division SV in which servo information is recorded and a data division DATA in which data is recorded. In this embodiment, various kinds of control to be given to a sense current flowing into an MR head will be described on the assumption that N servo information items are recorded along one circumference of each track on a magnetic disk.

Figure 6:
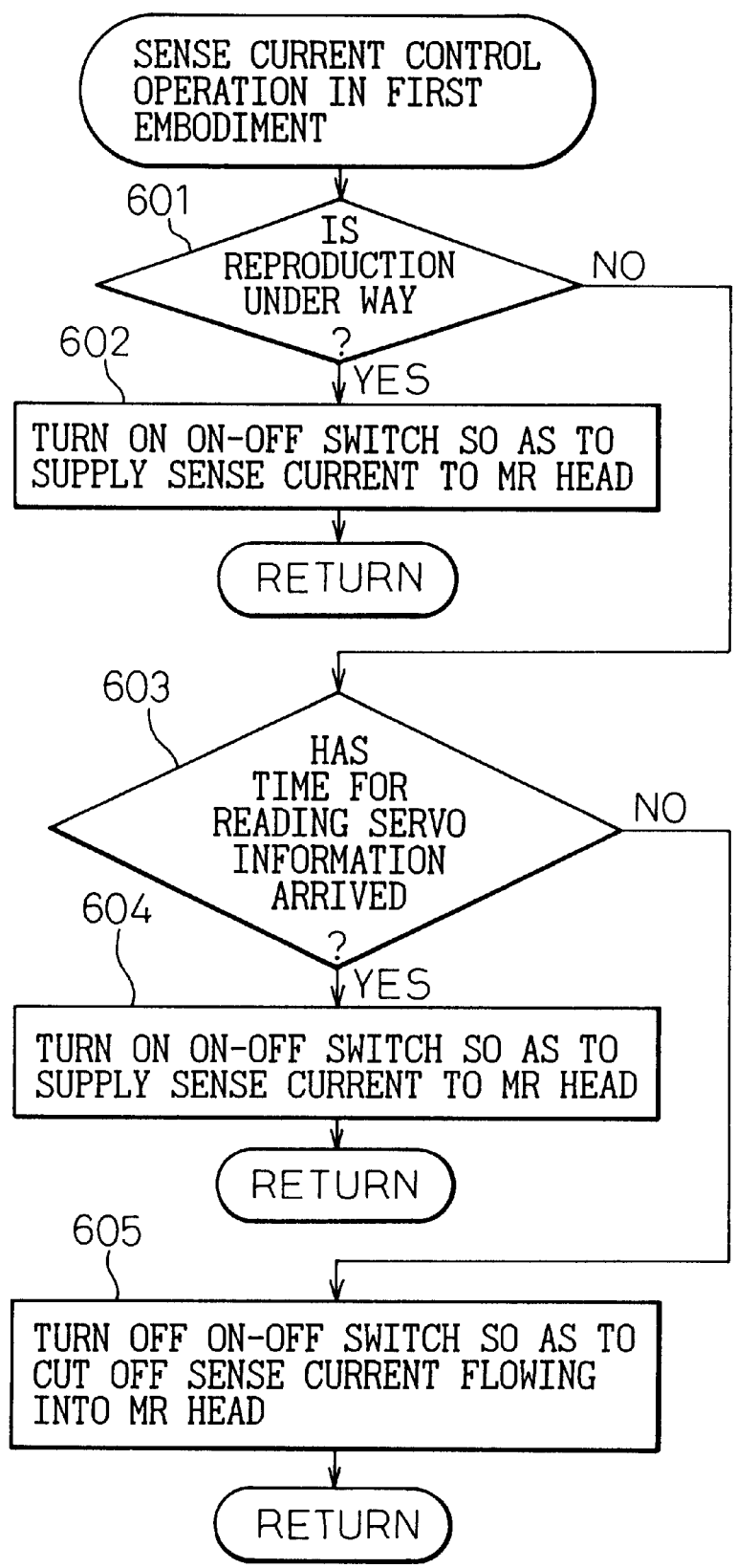
FIG. 6 is a flowchart describing a control flow for a sense current control operation in accordance with the first embodiment of the present invention.

FIG. 6 describes a control flow for a sense current control operation in accordance with the first embodiment of the present invention. The control flow shall be implemented in, for example, the magnetic reproduction apparatus of the first embodiment of the present invention described with reference to FIG. 2.

At step 601, it is judged whether or not the magnetic disk unit 11 is engaged in reproduction. If the magnetic disk unit 11 is engaged in reproduction, reproduction of data by an MR head 2 must be carried out. Control is therefore passed to step 602. An associated on-off switch 71 is turned on so that a sense current will flow into the MR head 2. This routine is then terminated.

If it is judged at step 601 that the magnetic disk unit 11 is not engaged in reproduction, control is passed to step 603. If it is judged that the magnetic disk unit 11 is not engaged in reproduction, recording, seeking, or track tracing is under way. In this case, it is necessary to read servo information by an MR head 2. At step 603, therefore, it is judged whether or not the timing of reading servo information has come.

If it is judged at step 603 that the timing of reading servo information has come, control is passed to step 604. An associated on-off switch 71 is turned on so that a sense current will flow into the MR head 2. The routine is then terminated. If it is judged at step 603 that the timing of reading servo information has not come, it means that the MR head 2 lies in a data division in which a sense current need not be supplied. Control is therefore passed to step 605. The on-off switch 71 is turned off in order to cut off the sense current flowing into the MR head 2. The routine is then terminated.

FIGS. 11 to 13 are timing charts showing the relationships between gate signals to be applied for recording, reproduction, and seeking or track tracing respectively and a sense current controlled according to the control flow of the first embodiment described in FIG. 6 with respect to the data format for the sector-servo type magnetic disk apparatus 11.

In FIGS. 11 to 13, there are shown a Servo gate signal SG representing servo information, a Write gate signal WG instructing writing in a data division, and a Read gate signal RG instructing read from a data division. As shown in FIGS. 11 to 13, when an MR head 2 lies in a servo information division and data division, a sense current in accordance with a prior art is supplied to the MR head 2 irrespective of whether the magnetic disk unit 11 is engaged in recording, reproduction, seeking, or track tracing. This becomes a cause of electromigration.

As seen from FIGS. 11 to 13, a period during which information read by an MR head 2 is needed includes periods during which the MR head passes through a servo information division C and data division D for reproduction, and periods during which the MR head passes through servo information areas A and E for recording, seeking, and track tracing. During periods during which an MR head passes through data divisions B and F for recording, seeking, and track tracing, information read by the MR head 2 is not needed. According to the sense current control operation in the first embodiment of the present invention which has been described in FIG. 6, as shown in FIG. 12, when reproduction is under way, while an MR head 2 passes through the servo information division C and data division D, a sense current is supplied to the MR head 2. However, when recording, seeking, or track tracing is under way, as shown in FIGS. 11 and 13, unless an MR head passes through the servo information division A or E, a sense current is not supplied.

The above control operation of controlling supply of a sense current is executed according to the control flow described in FIG. 6, wherein the power supply control circuit 2 controls the on-off operation of an on-off switch 71. Specifically, when recording, seeking, or track tracing is under way, the supply control circuit 6 turns off an on-off switch 71 so as to cut off a sense current responsively to the start of a Write gate signal WG indicating a data division or the end of a Servo gate signal SG representing servo information, or using an equivalent signal as a trigger.

Otherwise, the supply control circuit 6 turns on an on-off switch 71 so as to supply a sense current in reponse to the end of the Write gate signal WG indicating a data division or the start of the Servo gate signal SG representing servo information, or using an equivalent signal as a trigger.

As mentioned above, since an MR head 2 does not conduct a sense current while it passes through the data division D or F during recording, seeking, or track tracing during which information read by the MR head 2 is not needed, electromigration can be suppressed.

Figure 7:
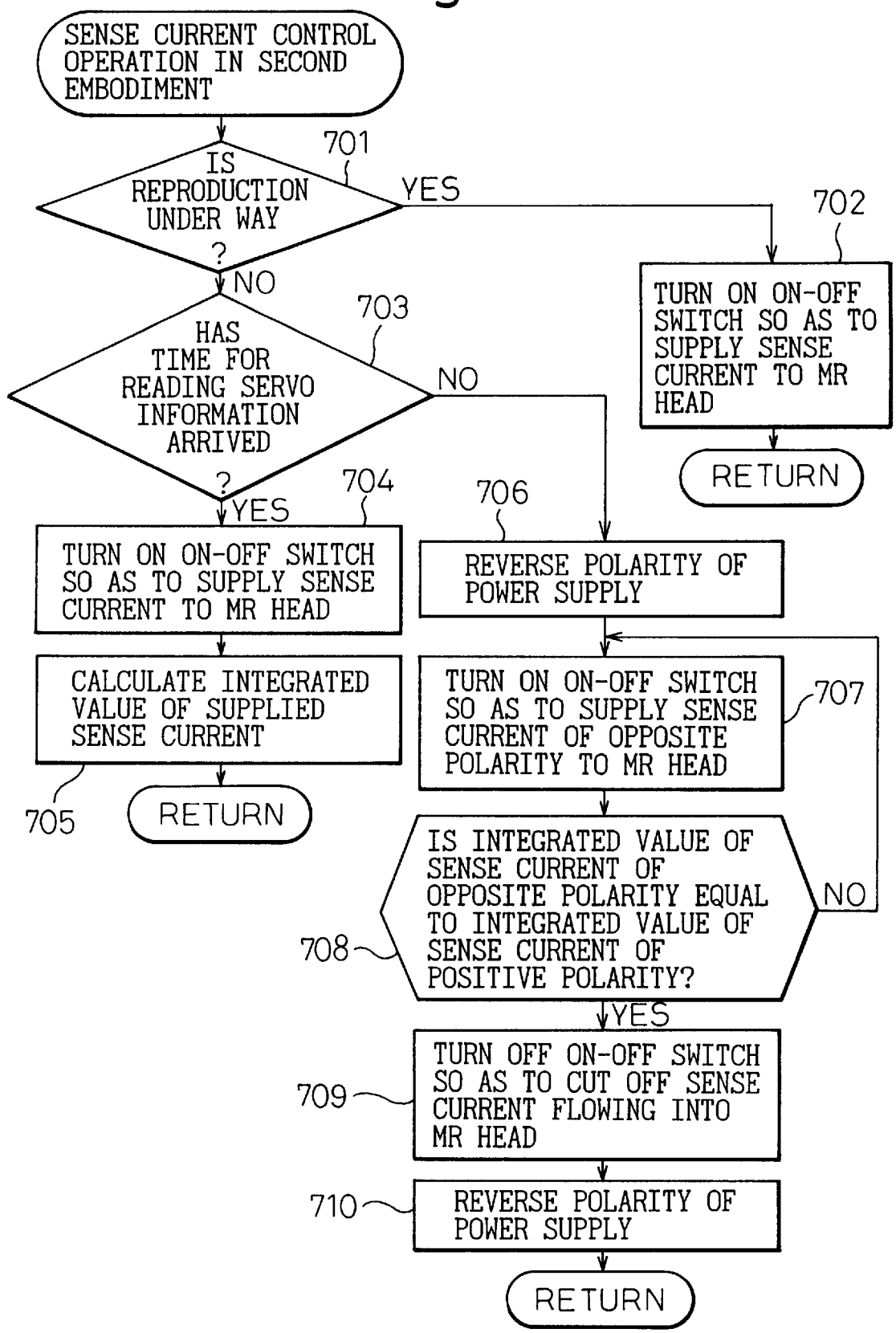
FIG. 7 is a flowchart describing a control flow for a sense current control operation in accordance with the second embodiment of the present invention.

FIG. 7 describes a control flow for a sense current control operation in accordance with the second embodiment of the present invention. The description will proceed on the assumption that the control flow is implemented in the magnetic reproduction apparatus of the first embodiment described with reference to FIG. 2.

At step 701, it is judged whether or not the magnetic disk unit 11 is engaged in reproduction. If the magnetic disk unit 11 is engaged in reproduction, reproduction of data by an MR head 2 should be carried out. Control is therefore passed to step 702. An associated on-off switch 71 is turned on so that a sense current will flow into the MR head 2. The routine is then terminated.

By contrast, if it is judged at step 701 that the magnetic disk unit 11 is not engaged in reproduction, recording, seeking, or track tracing is under way. Control is therefore passed to step 703. At step 703, it is judged whether or not the timing of reading servo information has come. If it is judged at step 703 that the timing of reading servo information has come, control is passed to step 704. The on-off switch 71 is turned on so that a sense current will flow into the MR head 2. At step 705, an integrated value of the supplied sense current is calculated by integrating the levels of the sense current. The routine is then terminated.

If it is found at step 703 that the timing of reading servo information has not come, the MR head 2 lies in a data division in which it is unnecessary to supply a sense current. Control is therefore passed to step 706. A destination to which the selection switch 81 is connected is changed from the positive voltage source +Vcc to the negative voltage source −Vcc, whereby an output voltage is reversed. At step 707, the on-off switch 71 is turned on so that a sense current of opposite polarity will flow into the MR head 2.

At step 708, it is judged whether or not the level of the sense current of opposite polarity to be supplied to the MR head 2 becomes equal to the integrated value of the sense current of positive polarity calculated at step 705. If they are unequal, control is returned to step 707. When the integrated value of the sense current of opposite polarity to be supplied to the MR head becomes equal to the integrated value of the sense current supplied to the MR head 2, control is passed to step 709. The on-off switch 71 is then turned off, thus cutting off the sense current flowing into the MR head. At step 710, the destination to which the selection switch 81 is connected is changed from the negative voltage source −Vcc to the positive voltage source +Vcc. The output voltage of the power supply 8 is thus changed again, and then the routine is terminated.

Figure 16:
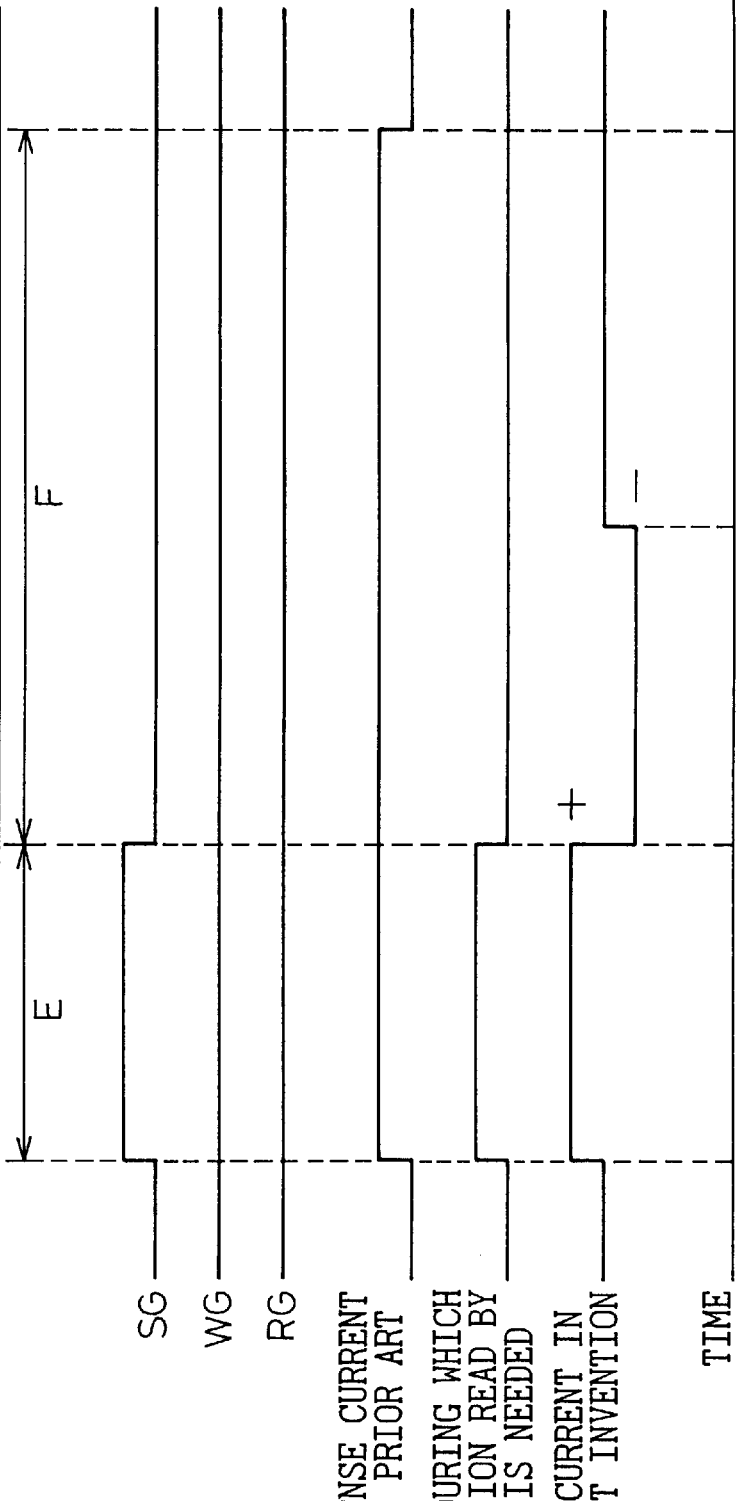
FIG. 16 is a timing chart showing the relationship between a gate signal to be applied for seeking or track tracking and a sense current controlled according to the control flow of the second embodiment of the present invention with respect to the data format for the sector-servo type magnetic disk unit.

FIGS. 14 to 16 are timing charts showing the relationships between gate signals to be applied for recording, reproduction, and seeking or track tracing respectively and a sense current controlled according to the control flow described in FIG. 7 in the second embodiment with respect to the data format for the sector-servo type magnetic disk unit 21.

In FIGS. 14 to 16, there are shown a Servo gate signal SG representing servo information, a Write gate signal WG indicating writing in a data division, and a Read gate signal RG indicating read from a data division. Except a sense current in accordance with the present invention, the signals shown in FIGS. 14 to 16 have the same characteristics as those shown in FIGS. 11 to 13.

In a control flow for a sense current control operation in accordance with the second embodiment, similarly to the control flow for a sense current control operation in accordance with the first embodiment of the present invention which has been described in FIG. 6, when reproduction is under way, while an MR head 2 passes through a servo information division C and data division D, a sense current is supplied to the MR head (See FIG. 15). When reading, seeking, or track tracing is under way, while an MR head passes through a servo information division A or E, a sense current is supplied (See FIGS. 14 and 16). According to the control flow of the second embodiment, when recording, seeking, or track tracing is under way, as shown in FIGS. 14 and 16, while an MR head passes through a data division B or F. a sense current whose polarity is opposite to the polarity of the sense current supplied while the MR head passes through the servo information division A or E is supplied over a period corresponding to the time required for the MR head to pass through the servo information division A or E.

The control operation for controlling supply of a sense current can be executed according to the control flow described in FIG. 7, wherein the power supply control circuit 6 shown in FIG. 2 controls the on-off operation of an on-off switch 71, and changes the destination to which the selection switch is connected from one to the other. As mentioned above, while an MR head 2 passes through the data division D or F during recording, seeking, or track tracing during which information read by the MR head is not needed, the MR head 2 does not conduct a sense current. Moreover, while the MR head 2 passes through a servo information division during the recording, seeking, or track tracing, a sense current that is opposite in polarity to the sense current supplied to the MR head 2 is supplied. Consequently, movements of elements constituting a component which occur at an atomic level can be suppressed, and electromigration in an MR head can be suppressed further.

Figure 8B:
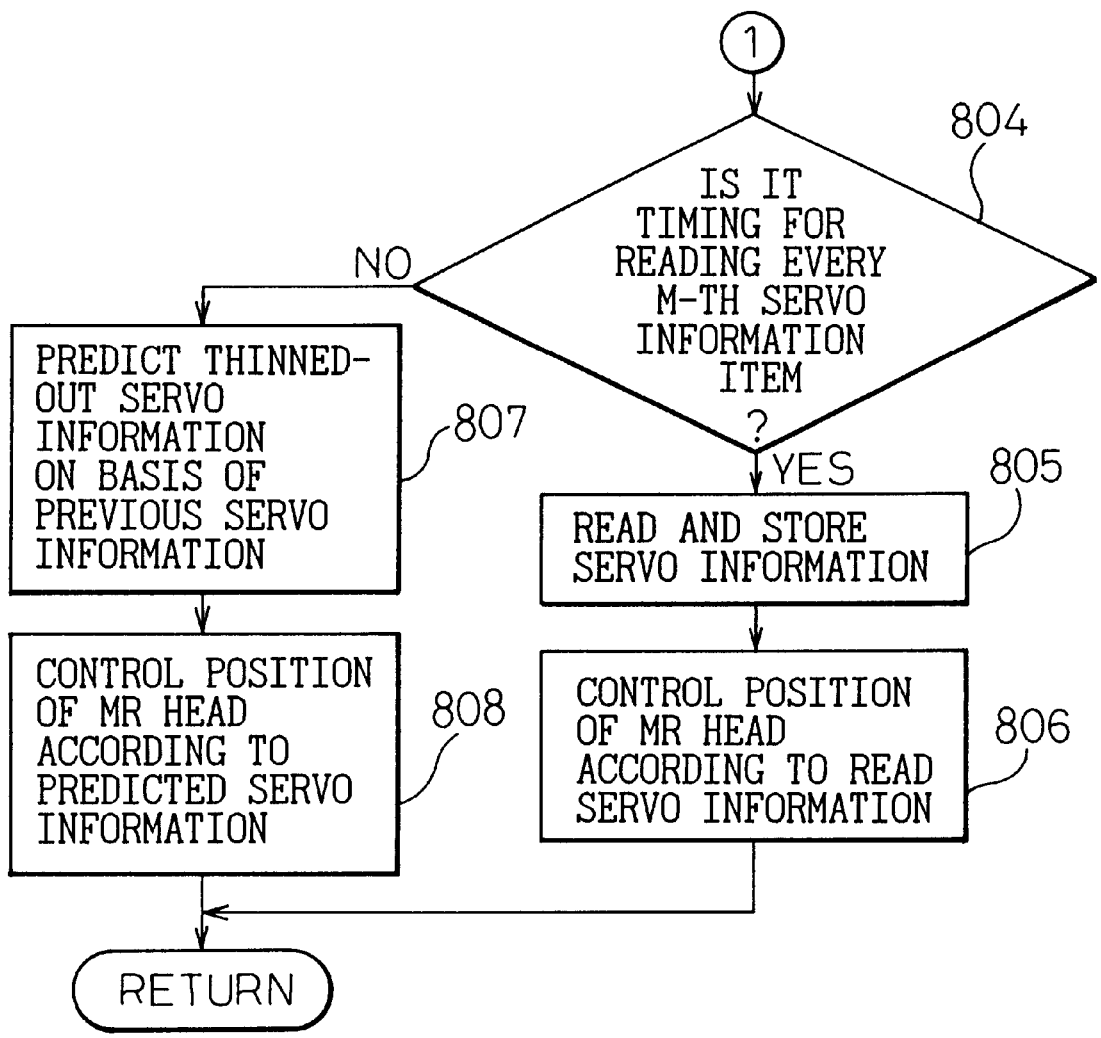

FIG. 8 shows a control flow for a sense current control operation in accordance with the third embodiment of the present invention. The description will proceed on the assumption that the control flow is implemented in, for example, the magnetic reproduction apparatus in accordance with the first embodiment of the present invention which has been described in conjunction with FIG. 2.

At step 801, it is judged whether or not the magnetic disk unit 11 is engaged in reproduction. If the magnetic disk unit 11 is engaged in reproduction, reproduction of data by an MR head 2 should be carried out. Control is therefore passed to step 811. An associated on-off switch 71 is turned on so that a sense current will flow into the MR head 2. At step 812, all servo information items read by the MR head 2 are detected. At step 813, all the detected servo information items are used to execute a position control operation for the MR head 2.

By contrast, if it is judged at step 801 that the magnetic disk unit 11 is not engaged in reproduction, control is passed to step 802. It is then judged whether or not the magnetic disk unit is engaged in recording. If the magnetic disk unit 1 is engaged in recording, control is passed to step 809. It is then judged whether or not the timing of reading servo information has come. When the timing of reading servo information has come, control is passed to step 811. The processing from step 811 to step 813 is carried out. If it is judged at step 809 that the timing of reading servo information has not come, control is passed to step 810. The on-off switch 71 is turned off in order to cut off the sense current flowing into the MR head 2. The routine is then terminated.

By contrast, if it is judged at step 802 that the magnetic disk unit is engaged in seeking or track tracing, control is passed to step 803. At step 803, it is judged whether or not the timing of reading servo information has come. If it is judged at step 803 that the timing of reading servo information has not come, the on-off switch 71 is turned off in order to cut off the sense current flowing into the MR head 2. The routine is then terminated.

If it is judged at step 803 that the timing of reading servo information has come, control is passed to step 804. It is then judged whether or not the timing of reading servo information is the timing of reading every M-th servo information item. If it is judged at step 804 that the timing of reading servo information is the timing of reading every M-th servo information item, control is passed to step 805. Servo information is then read and stored. At step 806, the read servo information is used to execute a position control operation for the MR head 2. The routine is then terminated.

In contrast, if it is judged at step 804 that the timing of reading servo information is not the timing of reading every M-th servo information item, control is passed to step 807. At step 807, thinned-out servo information is predicted on the basis of previous servo information. At step 808, the predicted servo information is used to execute a position control operation for the MR head 2. The routine is then terminated.

Figure 17A:
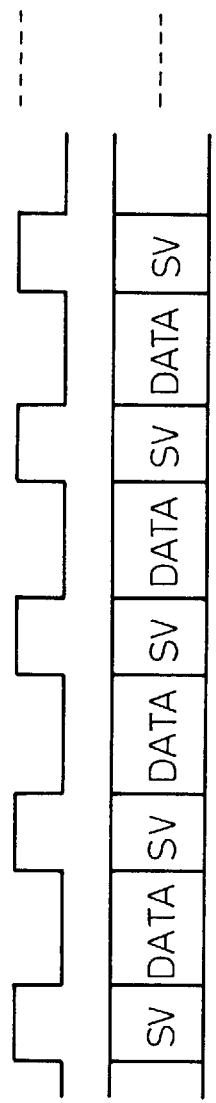
FIG. 17A is a timing chart for explaining the way of supplying a sense current in accordance with the present invention in relation to the data format for the sector-servo type magnetic disk unit on the assumption that thinning is not carried out.
Figure 17B:
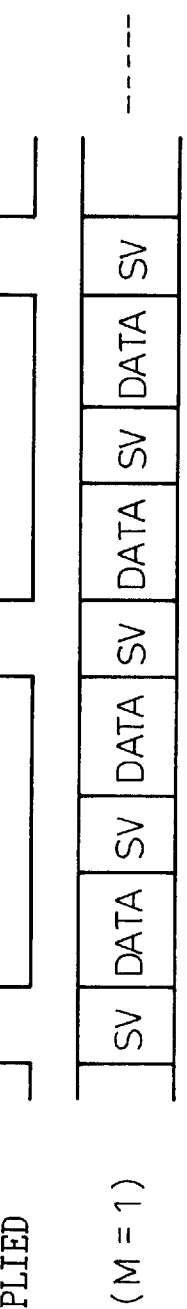
FIG. 17B is a timing chart for explaining the way of supplying a sense current in accordance with the present invention in relation to the data format for the sector-servo type magnetic disk unit on that assumption that thinning is carried out in order to sample every other servo information item.
Figure 17C:
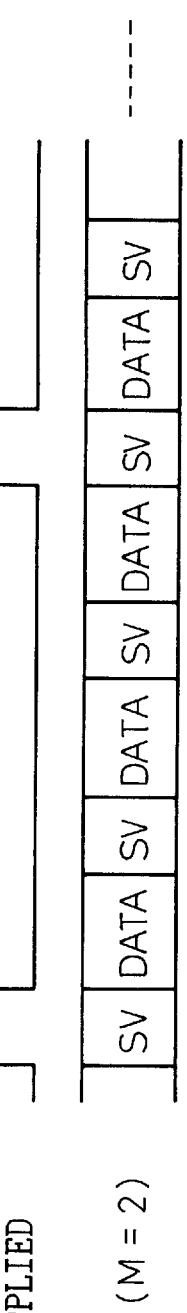
FIG. 17C is a timing chart for explaining the way of supplying a sense current in accordance with the present invention in relation to the data format for the sector-servo type magnetic disk unit on the assumption that thinning is carried out in order to sample every third servo information item.

During seeking or track tracing, as shown in FIG. 17*a*, every time an MR head 2 passes through a servo information division SV along each track on the magnetic disk 1, a sense current is supplied to the MR head 2. In this embodiment, this state shall be regarded as a state M=0. In the third embodiment, as shown in FIG. 17*b*, for example, every other servo information division SV is read out by an MR head 2, and a servo information division SV next to every other servo information division SV is not read out. In other words, every second servo information division SV is read out. This state shall be regarded as a state M=1. FIG. 17*c* shows how to supply a sense current to an MR head 2 in a state M=2.

As mentioned above, in the third embodiment, when the disk unit 11 is engaged in seeking or track tracing, every M-th servo information item is read. When no servo information is read, thinned-out servo information is predicted on the basis of previous servo information. Based on the predicted servo information, the position of an MR head 2 is controlled.

In the control method for a sense current in accordance with the third embodiment, the integrated value of a sense current flowing into an MR head 2 gets smaller than it is when all servo information divisions are read out during seeking or track tracing. Electromigration in the MR head 2 can therefore be suppressed.

Figure 9A:
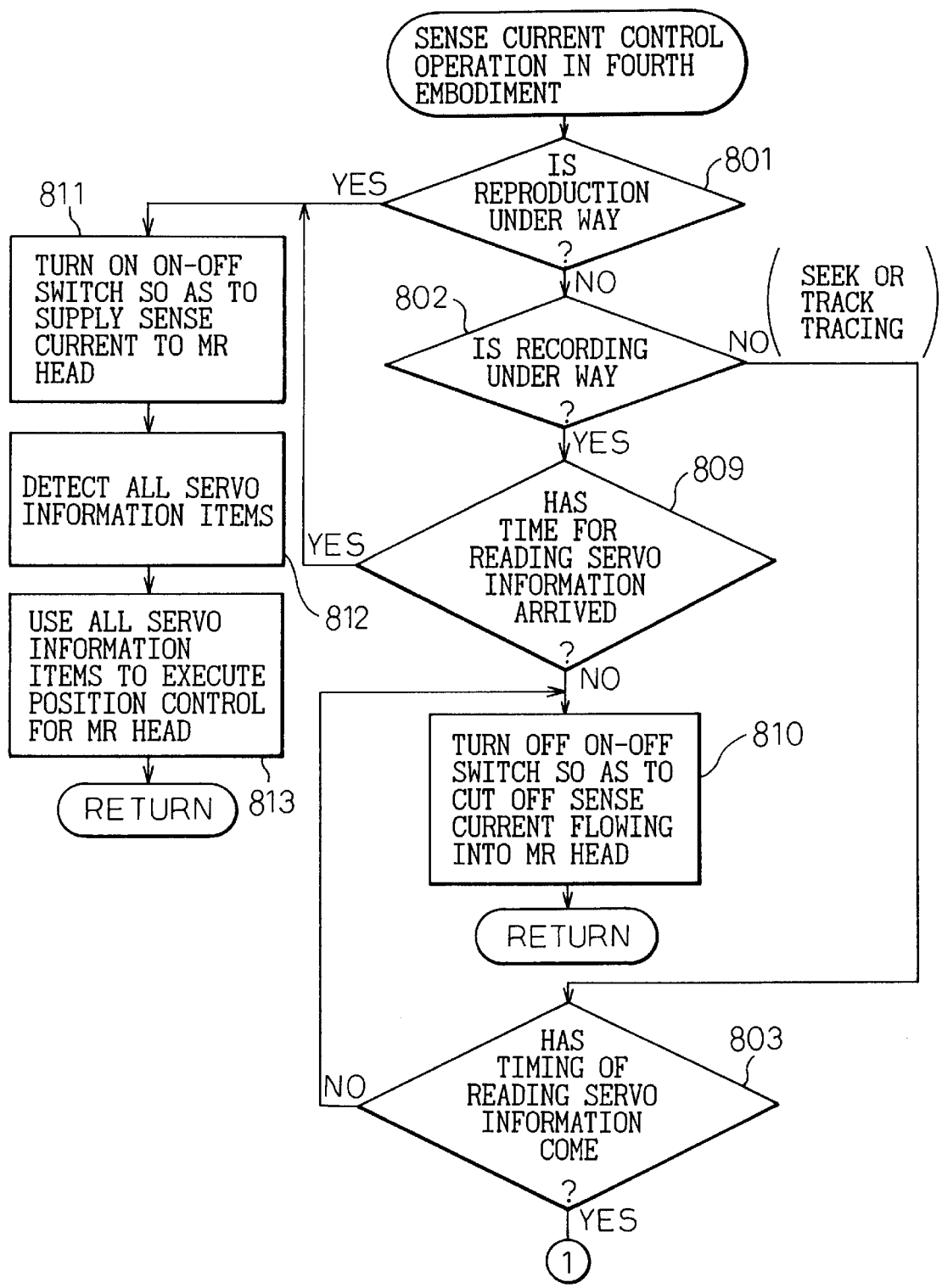
FIGS. 9A and 9B are flowcharts describing a control flow for a sense current control operation in accordance with the fourth embodiment of the present invention.
Figure 9B:
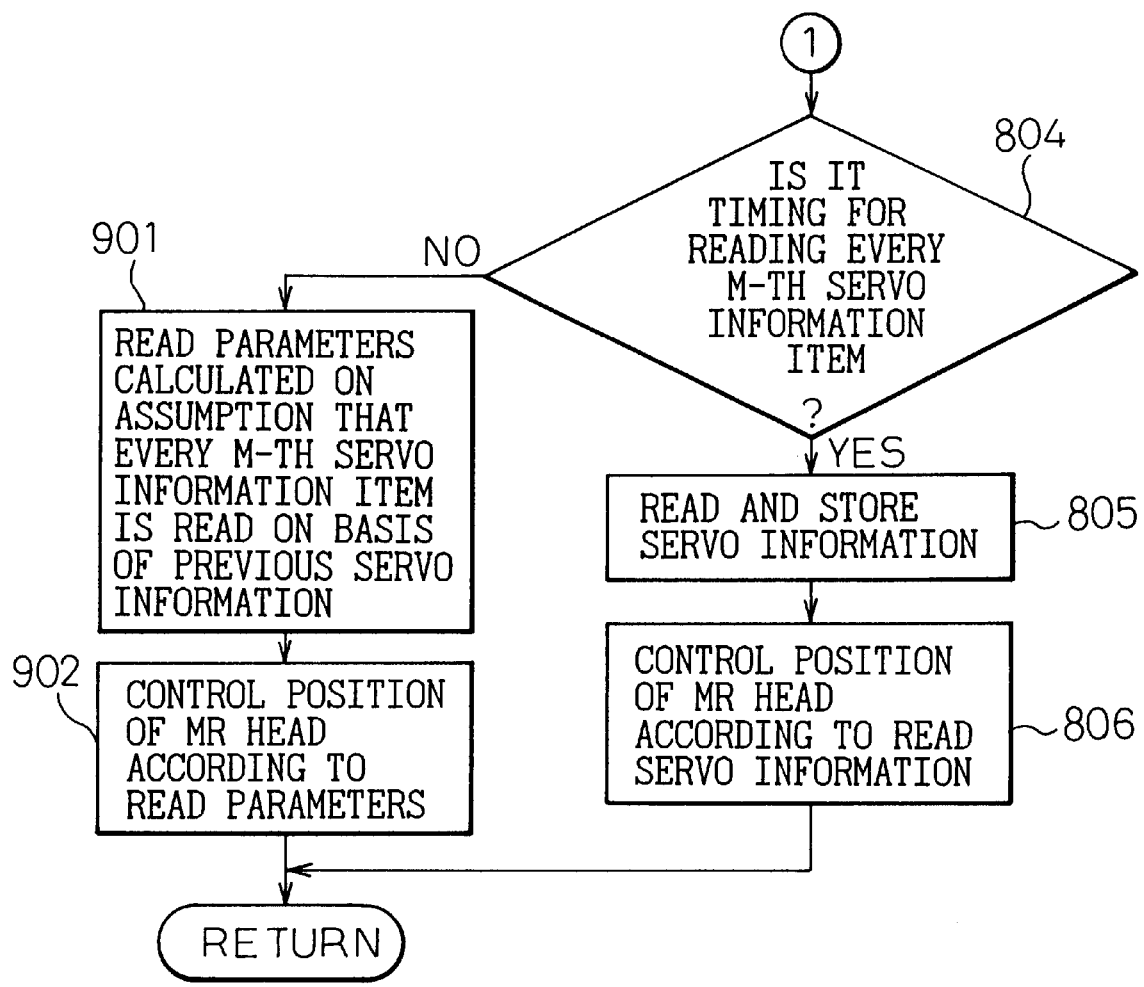

FIG. 9 describes a control flow for a sense current control operation in accordance with the fourth embodiment of the present invention. The description will proceed on the assumption that the control flow is implemented in the magnetic reproduction apparatus in accordance with the first embodiment of the present invention which has been described in conjunction with FIG. 2.

The control flow for a sense current control operation in accordance with the fourth embodiment which is described in FIG. 9 is substantially identical to the control flow for a sense current control operation in accordance with the third embodiment which has been described in FIG. 8. A difference lies in a control operation to be carried out when the disk unit 11 is engaged in seeking or track tracing and it is found at step 804 that the timing is not the timing of reading every M-th servo information item. The same step numbers are assigned to the steps in the control flow described in FIG. 9 identical to the steps in the control flow described in FIG. 8. The description of the steps will be omitted.

In the control flow for a sense current control operation according to the third embodiment which has been described in FIG. 8, when the timing is not the timing of reading every M-th servo information item, thinned-out servo information is predicted at step 807. At step 808, the position of an MR head 2 is controlled on the basis of the predicted servo information. In contrast, in the control flow for a sense current control operation according to the fourth embodiment which is described in FIG. 9, when the timing is not the timing of reading every M-th servo information item, control parameters calculated on the assumption that every M-th servo information item will be read are read on the basis of previous servo information at step 901. At step 902, the position of an MR head 2 is controlled according to the read control parameters. The control parameters are stored in the main memory unit 63 shown in FIG. 2.

According to the control method for a sense current in the fourth embodiment, the integrated value of a sense current flowing into an MR head gets smaller than it is when servo information is read out from all servo information divisions during seeking or track tracing. Electromigration in an MR head 2 can therefore be suppressed.

The control flows for a sense current control operation to be carried out in the magnetic disk unit 11 shown in FIG. 2 in accordance with the first to fourth embodiments of the present invention have been described so far. The control flows may be implemented in the magnetic disk unit 21 shown in FIG. 4. In this case, when it is unnecessary to supply a sense current to an MR head 2, the path between the current supply circuit 3 and power supply 8 is disconnected. An excess power consumption in the current supply circuit 3 can be minimized.

Figure 10A:
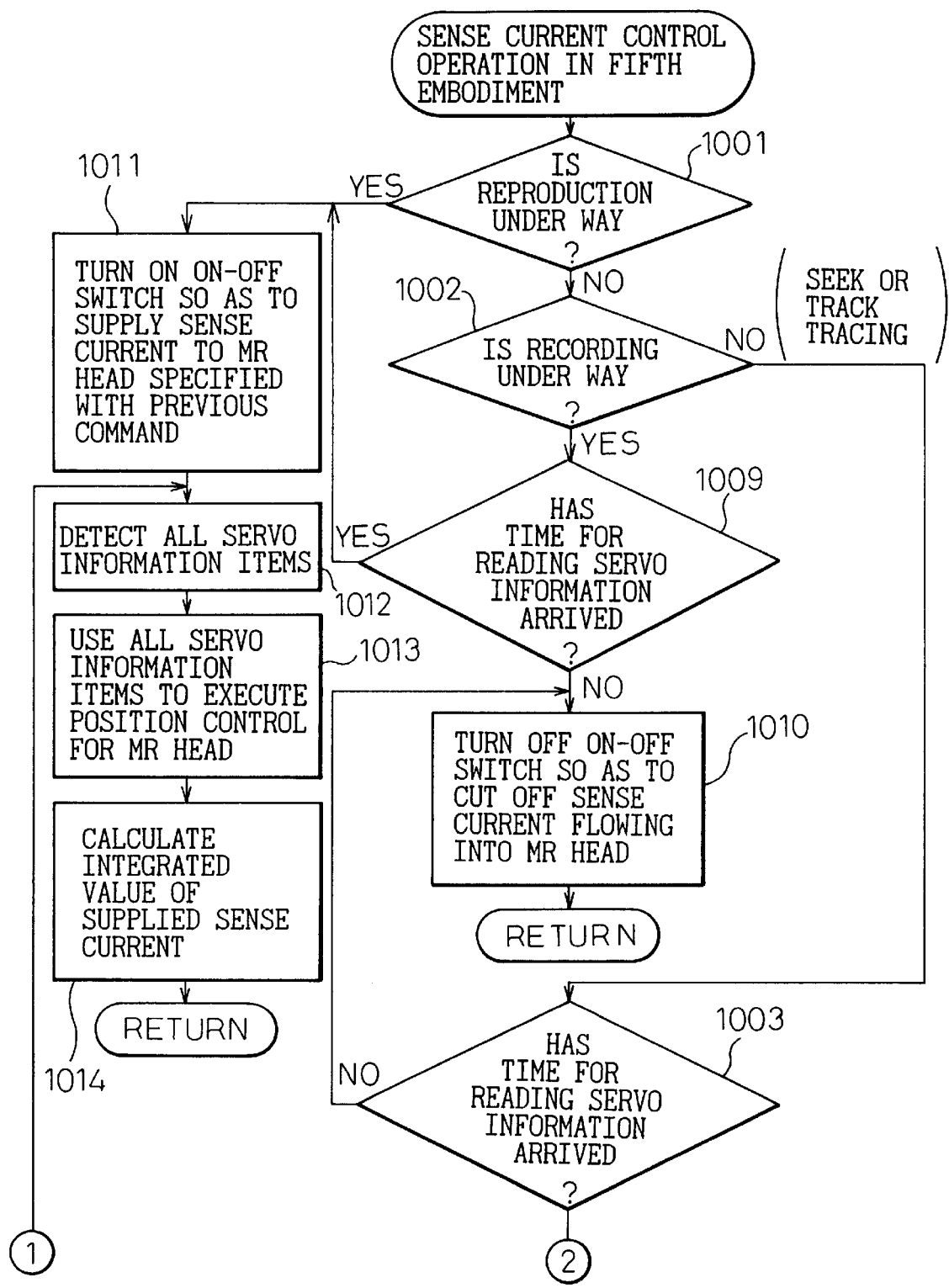
FIGS. 10A and 10B are flowcharts describing a control flow for a sense current control operation in accordance with the fifth embodiment of the present invention.
Figure 10B:
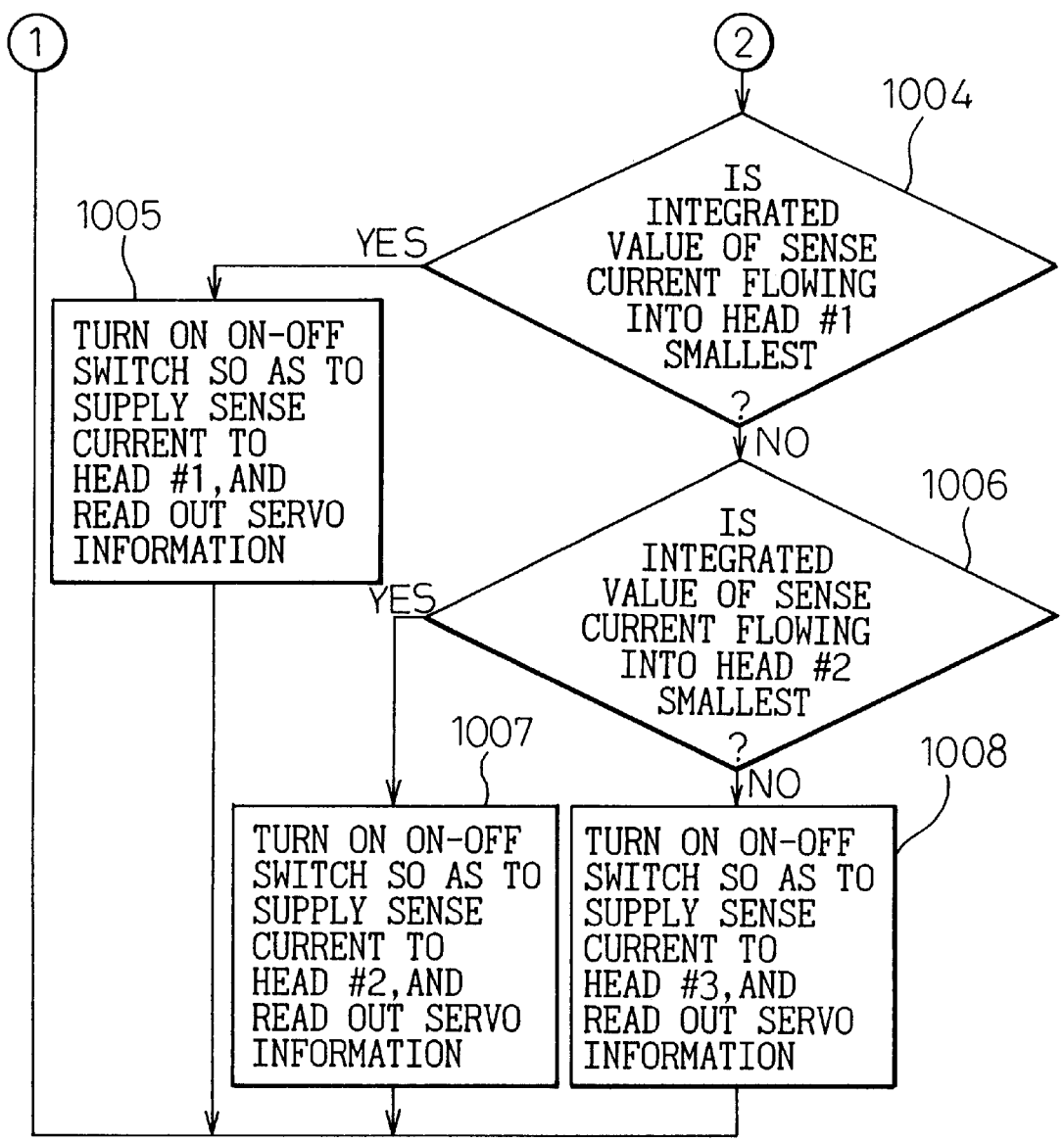

FIG. 10 describes a control flow for a sense current control operation in accordance with the fifth embodiment of the present invention. The control flow can be implemented in the magnetic reproduction apparatus in accordance with the first embodiment of the present invention which has been described in conjunction with FIG. 2, that is, the configuration capable of controlling supply of a sense current to each MR head 2. For brevity's sake, in this embodiment, the number of MR heads 2 included in the apparatus shown in FIG. 2 shall be three, or heads #1, #2, and #3 shall be included.

At step 1001, it is judged whether or not the magnetic disk unit 11 is engaged in reproduction. If the magnetic disk unit 11 is engaged in reproduction, reproduction of data by an MR head 2 should be carried out. Control is therefore passed to step 1011. An associated on-off switch 71 is turned on so that a sense current will flow into an MR head 2 specified with a previous command. At step 1012, all servo information items read by the MR head 2 are detected. At step 1013, all the detected servo information items are used to execute a position control operation for the MR head 2. Thereafter, at step 1014, the levels of a sense current supplied to the MR head are integrated. The routine is then terminated. The integrated value of the sense current is stored in the integrated value-of-sense current memory 63 shown in FIG. 2.

If it is judged at step 1001 that the magnetic disk unit 11 is not engaged in reproduction, control is passed to step 1002. It is then judged whether or not the magnetic disk unit is engaged in recording. If the magnetic disk unit 11 is engaged in recording, control is passed to step 1009. It is then judged whether or not the timing of reading servo information has come. When the timing of reading servo information has come, control is passed to step 1011. The processing from step 1011 to step 1014 is then carried out. If it is judged at step 1009 that the timing of reading servo information has not come, control is passed to step 1010. The on-off switch 71 is turned off in order to cut off the sense current flowing into the MR head 2. The routine is then terminated.

By contrast, if it is judged at step 1002 that the magnetic disk unit is engaged in seeking or track tracing, control is passed to step 1003. At step 1003, it is judged whether or not the timing of reading servo information has come. If it is judged at step 1003 that the timing of reading servo information has not come, control is passed to step 1010. The on-off switch 71 is then turned off in order to cut off the sense current flowing into the MR head 2. The routine is then terminated.

If it is judged at step 1003 that the timing of reading servo information has come, control is passed to step 1004. It is then judged whether or not the integrated value of a sense current flowing into head #1 is the smallest. If the integrated value of the sense current flowing into head #1 is the smallest, control is passed to step 1005. An on-off switch 71 connected in series with head #1 is turned on so that a sense current will flow into head #1. Servo information is then read out. After the servo information is read out by head #1, control is passed to step 1012. The processing from step 1012 to step 1014 is then carried out.

In contrast, if it is judged at step 1004 that the integrated value of the sense current flowing into head #1 is not the smallest, control is passed to step 1006. It is then judged whether or not the integrated value of a sense current flowing into head #2 is the smallest. If the integrated value of the sense current flowing into head #2 is the smallest, control is passed to step 1007. An on-off switch 71 connected in series with head #2 is turned on so that a sense current will flow into head #2. Servo information is then read out. After the servo information is read out by head #2, control is passed to step 1012. The processing from step 1012 to step 1014 is then carried out.

If it is judged at step 1006 that the integrated value of the sense current flowing into head #2 is not the smallest, the integrated value of a sense current flowing into head #3 is the smallest. Control is therefore passed to step 1008. An on-off switch 71 connected in series with head #3 is then turned on so that a sense current will flow into head #3. Servo information is then read out. After the servo information is read out by head #3, control is passed to step 1012. The processing from step 1012 to step 1014 is then carried out.

As mentioned above, the sense current control operation in accordance with the fifth embodiment is such that a head having conducted a sense current of the smallest integrated value is selected from among a plurality of MR heads 2, and used to read out servo information during seeking or track tracing, The time during which an MR head 2 conducts a sense current becomes uniform among the plurality of MR heads 2. Consequently, electromigration can be suppressed effectively. Eventually, the reliability of the magnetic reproduction unit 11 can be improved and the service life thereof can be extended.

As described so far, according to the present invention, in a magnetic reproduction apparatus for reproducing information by means of an MR head, electromigration in an MR head can be suppressed effectively. Consequently, the power consumption of the magnetic reproduction apparatus can be minimized, and the durability and reliability thereof can be improved.

What is claimed is:

1. A magnetic reproduction apparatus in which information magnetically recorded on at least one magnetic disk recording medium is read by supplying a sense current to an MR head opposed to the record surface of said recording medium using a current supply means, and then decoded by a signal decoding means, the magnetic disk recording medium having N servo information items to be used to control the position of said MR head residing along one circumference of said disk, comprising:

an MR head information judgment means for judging whether or not information to be read out from said recording medium by said MR head is needed; and a current supply control means that when information to be read out by said MR head is needed, allows said current supply means to supply a sense current to said MR head; such that when the timing of reading servo information from said recording medium has come, said current supply control means judges that information to be read out by said MR head is needed;

a servo information thinning and sampling means for sampling and reading every M-th servo information item by thinning the N servo information items;

a servo information prediction means for predicting current servo information as a substitute for thinned-out servo information on the basis of such information as a previous rotating speed of said disk, the position of said MR head, an output current, and a bias current; and a position control means for controlling the position of said MR head on the basis of the predicted servo information.

2. A magnetic reproduction apparatus having an MR head according to claim 1, further comprising:

a reproduction detection means for detecting that said magnetic reproduction apparatus is engaged in reproduction; and a polarity reversal means for supplying a sense current to said MR head while reversing the polarity of the sense current according to a predetermined timing when said magnetic reproduction apparatus is not engaged in reproduction.

3. A magnetic reproduction apparatus having an MR head according to claim 2, wherein said predetermined timing is set within a period during which information to be read out from said recording medium by said MR head is judged not to be needed by said MR head information judgment means.

4. A magnetic reproduction apparatus having an MR head according to claim 3, wherein a plurality of MR heads are included, further comprising:

an integration means for calculating the time during which each MR head conducts the sense current;

a shortest operation MR head identification means for identifying an MR head that has conducted the sense current over the shortest time or the sense current of the smallest integrated value; and a servo current selection and supply means that when servo information is to be read out by an MR head, reads out servo information by supplying the sense current to an MR head that has conducted the sense current over the shortest time or the sense current of the smallest integrated value.

5. A magnetic reproduction apparatus having an MR head according to claim 3, wherein a plurality of MR heads are included, further comprising:

a servo current selection and supply means that when servo information is to be read out by an MR head, reads out servo information by supplying the sense current successively to said MR heads over the same time per head.

6. A magnetic reproduction apparatus having an MR head according to claim 1, and N servo information items to be used to control the position of said MR head reside along one track of said disk, further comprising:

a control parameter storage means for storing parameters for position control specified for thinning and sampling which are different from parameters for position control specified for normal position control; and the position control means controls the position of said MR head using the different position control parameters for the purpose of thinning and sampling of servo information.

7. A magnetic reproduction apparatus having an MR head according to claim 6, further comprising:

a reproduction detection means for detecting that said magnetic reproduction apparatus is engaged in reproduction; and a polarity reversal means for supplying a sense current to said MR head while reversing the polarity of the sense current according to a predetermined timing when said magnetic reproduction apparatus is not engaged in reproduction.

8. A magnetic reproduction apparatus having an MR head according to claim 7, wherein said predetermined timing is set within a period during which information to be read out from said recording medium by said MR head is judged not to be needed by said MR head information judgment means.

9. A magnetic reproduction apparatus having an MR head according to claim 8, wherein a plurality of MR heads are included, further comprising:

an integration means for calculating the time during which each MR head conducts the sense current;

a shortest operation MR head identification means for identifying an MR head that has conducted the sense current over the shortest time or the sense current of the smallest integrated value; and a servo current selection and supply means that when servo information is to be read out by an MR head, reads out servo information by supplying the sense current to an MR head that has conducted the sense current over the shortest time or the sense current of the smallest integrated value.

10. A magnetic reproduction apparatus having an MR head according to claim 8, wherein a plurality of MR heads are included, further comprising:

a servo current selection and supply means that when servo information is to be read out by an MR head, reads out servo information by supplying the sense current successively to said MR heads over the same time per head.

11. A magnetic reproduction apparatus having an MR head according to claim 1, further comprising:

a reproduction detection means for detecting that said magnetic reproduction apparatus is engaged in reproduction; and a polarity reversal means for supplying a sense current to said MR head while reversing the polarity of the sense current according to a predetermined timing when said magnetic reproduction apparatus is not engaged in reproduction.

12. A magnetic reproduction apparatus having an MR head according to any one of claims 2 to 11, wherein said MR head information judgment means judges whether or not information to be read out by said MR head is needed by recognizing which of a Read gate signal or Servo gate signal has been produced by said current supply control means.

13. A magnetic reproduction apparatus in which information magnetically recorded on at least one recording medium is read by supplying a sense current to an MR head opposed to the record surface of said recording medium using a current supply means, and then decoded by a signal decoding means, comprising:

an MR head information judgment means for judging whether or not information to be read out from said recording medium by said MR head is needed; and a current supply control means that when information to be read out by said MR head is needed, allows said current supply means to supply a sense current to said MR head; such that when the timing of reading servo information from said recording medium has come, said current supply control means judges that information to be read out by said MR head is needed;

wherein a plurality of MR heads are included, further the magnetic reproduction apparatus comprising:

an integration means for calculating the time during which each MR head conducts the sense current;

a shortest operation MR head identification means for identifying an MR head that has conducted the sense current over the shortest time or the sense current of the smallest integrated value; and a servo current selection and supply means that when servo information is to be read out by an MR head, reads out servo information by supplying the sense current to an MR head that has conducted the sense current over the shortest time or the sense current of the smallest integrated value.

14. A magnetic reproduction apparatus having an MR head according to claim 13, further comprising:

a reproduction detection means for detecting that said magnetic reproduction apparatus is engaged in reproduction; and a polarity reversal means for supplying a sense current to said MR head while reversing the polarity of the sense current according to a predetermined timing when said magnetic reproduction apparatus is not engaged in reproduction.

15. A magnetic reproduction apparatus having an MR head according to claim 14, wherein said predetermined timing is set within a period during which information to be read out from said recording medium by said MR head is judged not to be needed by said MR head information judgment means.

16. A magnetic reproduction apparatus in which information magnetically recorded on at least one magnetic disk recording medium is read by supplying a sense current to an MR head opposed to the record surface of said recording medium using a current supply means, and then decoded by a signal decoding means, the magnetic disk recording medium having N servo information items used to control the position of said MR head residing along one circumference of said disk, comprising:

an MR head information judgment means for judging whether or not information to be read out from said recording medium by said MR head is needed; and a current supply control means that when information to be read out by said MR head is needed, allows said current supply means to supply a sense current to said MR head, such that when the timing of reading servo information from said recording medium has come, said current supply control means judges that information to be read out by said MR head is needed;

a servo information thinning and sampling means for sampling and reading every M-th servo information item by thinning the N servo information items;

a servo information prediction means for predicting current servo information as a substitute for thinned-out servo information on the basis of such information as a previous rotating speed of said disk, the position of said MR head, an output current, and a bias current;

a position control means for controlling the position of said MR head on the basis of the predicted servo information; and wherein said MR head information judgment means judges whether or not information to be read out by said MR head is needed by recognizing which of a Read gate signal or Servo gate signal has been produced by said current supply control means.

17. A magnetic reproduction apparatus having an MR head according to claim 16, further comprising:

a reproduction detection means for detecting that said magnetic reproduction apparatus is engaged in reproduction; and a polarity reversal means for supplying a sense current to said MR head while reversing the polarity of the sense current according to a predetermined timing when said magnetic reproduction apparatus is not engaged in reproduction.

18. A magnetic reproduction apparatus having an MR head according to claim 17, wherein said predetermined timing is set within a period during which information to be read out from said recording medium by said MR head is judged not to be needed by said MR head information judgment means.

19. A magnetic reproduction apparatus having an MR head according to claim 18, wherein a plurality of MR heads are included, further comprising:

a servo current selection and supply means that when servo information is to be read out by an MR head, reads out servo information by supplying the sense current successively to said MR heads over the same time per head.

* * * * *